(12) United States Patent
Storm et al.

(10) Patent No.: US 12,019,704 B2
(45) Date of Patent: *Jun. 25, 2024

(54) SYSTEMS AND METHODS FOR ENCRYPTING DATA AND ALGORITHMS

(71) Applicant: TripleBlind, Inc.

(72) Inventors: Greg Storm, Kansas City, MO (US); Riddhiman Das, Parkville, MO (US); Babak Poorebrahim Gilkalaye, Kansas City, MO (US)

(73) Assignee: TRIPLEBLIND HOLDING COMPANY, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,001

(22) Filed: Feb. 13, 2023

(65) Prior Publication Data

US 2023/0198741 A1 Jun. 22, 2023

Related U.S. Application Data

(63) Continuation of application No. 16/828,085, filed on Mar. 24, 2020, now Pat. No. 11,582,203.
(Continued)

(51) Int. Cl.
*G06F 17/16* (2006.01)
*G06F 18/2113* (2023.01)
(Continued)

(52) U.S. Cl.
CPC ............ *G06F 17/16* (2013.01); *G06N 3/045* (2023.01); *G06N 3/048* (2023.01);
(Continued)

(58) Field of Classification Search
CPC ... H04L 9/0625; H04L 9/008; H04L 2209/46; H04L 63/0428; H04L 9/085; G06F 17/16;
(Continued)

(56) References Cited

U.S. PATENT DOCUMENTS 1,045,208 A 11/1912 Spencer
5,410,696 A 4/1995 Seki et al.
(Continued)

FOREIGN PATENT DOCUMENTS

WO WO 2021/119365 6/2021
WO WO 2021/119367 6/2021

OTHER PUBLICATIONS

Chandiramani, et al., "Performance Analysis and Distributed and Federated Learning Models on Private Data", Procedia Computer Science, 165(2019), pp. 349-355. (Year: 2019).
(Continued)

*Primary Examiner* — Moeen Khan

(57) ABSTRACT

Systems, methods, and computer-readable media for achieving privacy for both data and an algorithm that operates on the data. A system can involve receiving an algorithm from an algorithm provider and receiving data from a data provider, dividing the algorithm into a first algorithm subset and a second algorithm subset and dividing the data into a first data subset and a second data subset, sending the first algorithm subset and the first data subset to the algorithm provider and sending the second algorithm subset and the second data subset to the data provider, receiving a first partial result from the algorithm provider based on the first algorithm subset and first data subset and receiving a second partial result from the data provider based on the second algorithm subset and the second data subset, and determining a combined result based on the first partial result and the second partial result.

16 Claims, 21 Drawing Sheets

Related U.S. Application Data

(60) Provisional application No. 62/948,105, filed on Dec. 13, 2019.

(51) Int. Cl.

| | | |
|---|---|---|
| *G06F 18/24* | (2023.01) | |
| *G06F 18/2413* | (2023.01) | |
| *G06N 3/04* | (2023.01) | |
| *G06N 3/045* | (2023.01) | |
| *G06N 3/048* | (2023.01) | |
| *G06N 3/082* | (2023.01) | |
| *G06N 3/084* | (2023.01) | |
| *G06Q 20/12* | (2012.01) | |
| *G06Q 20/40* | (2012.01) | |
| *G06Q 30/0601* | (2023.01) | |
| *G06V 10/44* | (2022.01) | |
| *G06V 10/764* | (2022.01) | |
| *G06V 10/82* | (2022.01) | |
| *H04L 9/00* | (2022.01) | |
| *H04L 9/06* | (2006.01) | |
| *H04L 9/08* | (2006.01) | |
| *H04L 9/40* | (2022.01) | |

(52) U.S. Cl.
CPC ..... *G06Q 20/1235* (2013.01); *G06Q 30/0623* (2013.01); *H04L 9/0625* (2013.01); *H04L 63/0428* (2013.01); *G06F 18/2113* (2023.01); *G06F 18/24* (2023.01); *G06F 18/24133* (2023.01); *G06N 3/04* (2013.01); *G06N 3/082* (2013.01); *G06N 3/084* (2013.01); *G06Q 20/401* (2013.01); *G06Q 2220/00* (2013.01); *G06V 10/454* (2022.01); *G06V 10/764* (2022.01); *G06V 10/82* (2022.01); *H04L 9/008* (2013.01); *H04L 9/085* (2013.01); *H04L 2209/46* (2013.01)

(58) Field of Classification Search
CPC ............... G06F 18/24; G06F 18/24133; G06F 18/2113; G06N 3/048; G06N 3/045; G06N 3/04; G06N 3/082; G06N 3/084; G06Q 20/1235; G06Q 30/0623; G06Q 20/401; G06Q 2220/00; G06V 10/454; G06V 10/82; G06V 10/764
USPC ......................................................... 713/189
See application file for complete search history.

(56) References Cited

U.S. PATENT DOCUMENTS

| | | | |
|---|---|---|---|
| 6,353,816 B1 * | 3/2002 | Tsukimoto | G06N 3/08 706/21 |
| 6,668,325 B1 | 12/2003 | Collberg | |
| 9,464,043 B2 | 10/2016 | Roberge et al. | |
| 9,646,043 B1 | 5/2017 | Aronvich | |
| 10,311,372 B1 | 6/2019 | Hotchkies | |
| 10,360,220 B1 | 7/2019 | Gupta | |
| 10,362,001 B2 | 7/2019 | Yan | |
| 10,419,360 B2 | 9/2019 | Dawson | |
| 10,592,012 B2 | 1/2020 | Dawson | |
| 10,560,872 B2 | 2/2020 | Dawson | |
| 10,594,623 B2 | 3/2020 | Dawson | |
| 10,623,998 B2 | 4/2020 | Dawson | |
| 10,833,871 B2 | 11/2020 | Ranellucci | |
| 10,902,302 B2 | 1/2021 | Fu | |
| 10,924,460 B2 | 2/2021 | Storm | |
| 11,195,099 B2 | 12/2021 | Luo | |
| 11,316,676 B2 | 4/2022 | Kinjo | |
| 2003/0009482 A1 | 1/2003 | Benerjee | |
| 2006/0233377 A1 | 10/2006 | Chang | |
| 2007/0192864 A1 | 8/2007 | Bryant | |
| 2008/0082636 A1 | 4/2008 | Hofmann | |
| 2008/0201721 A1 | 8/2008 | Little | |
| 2009/0063485 A1 | 3/2009 | Schneider | |
| 2010/0100864 A1 | 4/2010 | Plants | |
| 2010/0281254 A1 | 11/2010 | Carro | |
| 2011/0161091 A1 | 6/2011 | Freishtat | |
| 2012/0047097 A1 | 2/2012 | Sengupta et al. | |
| 2013/0124491 A1 | 5/2013 | Pepper | |
| 2013/0272377 A1 | 10/2013 | Karczewicz | |
| 2014/0108813 A1 | 4/2014 | Pauker | |
| 2014/0371902 A1 | 12/2014 | McClelland | |
| 2015/0089243 A1 | 3/2015 | Veugen | |
| 2015/0156204 A1 | 6/2015 | Resch | |
| 2015/0242136 A1 | 8/2015 | Lin | |
| 2015/0288662 A1 | 10/2015 | Bilogrevic | |
| 2015/0371132 A1 | 12/2015 | Gemello | |
| 2016/0103901 A1 | 4/2016 | Kadav | |
| 2016/0156595 A1 | 6/2016 | Wu | |
| 2016/0205095 A1 | 7/2016 | Morel | |
| 2016/0294550 A1 | 10/2016 | French | |
| 2016/0335440 A1 | 11/2016 | Clark | |
| 2016/0342608 A1 | 11/2016 | Burshteyn | |
| 2017/0026342 A1 | 1/2017 | Sidana | |
| 2017/0116520 A1 | 4/2017 | Min | |
| 2017/0149796 A1 | 5/2017 | Gvili | |
| 2017/0228547 A1 | 8/2017 | Smith | |
| 2017/0323196 A1 * | 11/2017 | Gibson | G06F 7/5443 |
| 2017/0359321 A1 | 12/2017 | Teranishi | |
| 2017/0372201 A1 | 12/2017 | Gupta | |
| 2018/0039884 A1 | 2/2018 | Dalton | |
| 2018/0041477 A1 | 2/2018 | Shaposhnik | |
| 2018/0330237 A1 | 2/2018 | Yoshiyama | |
| 2018/0129900 A1 | 5/2018 | Kiraly | |
| 2018/0157972 A1 * | 6/2018 | Hu | G06V 20/56 |
| 2018/0205707 A1 | 7/2018 | Bellala | |
| 2018/0212770 A1 | 7/2018 | Costa | |
| 2018/0227296 A1 | 8/2018 | Joshi | |
| 2018/0349382 A1 * | 12/2018 | Kumaran | G06F 17/12 |
| 2018/0367509 A1 | 12/2018 | O'Hare | |
| 2019/0005399 A1 | 1/2019 | Noguchi | |
| 2019/0050204 A1 | 2/2019 | Hutter | |
| 2019/0073580 A1 | 3/2019 | Dzhulgakov | |
| 2019/0073586 A1 | 3/2019 | Chen | |
| 2019/0073590 A1 | 3/2019 | Wu | |
| 2019/0114511 A1 | 4/2019 | Gao et al. | |
| 2019/0130265 A1 | 5/2019 | Ling | |
| 2019/0208417 A1 | 7/2019 | Kang | |
| 2019/0228299 A1 | 7/2019 | Chandran | |
| 2019/0286973 A1 | 9/2019 | Kovvuri | |
| 2019/0294805 A1 | 9/2019 | Taylor | |
| 2019/0312772 A1 | 10/2019 | Zhao | |
| 2019/0318421 A1 | 10/2019 | Lyonnet | |
| 2019/0332944 A1 | 10/2019 | Bai | |
| 2019/0372760 A1 | 12/2019 | Zheng | |
| 2020/0014546 A1 * | 1/2020 | Karame | H04L 9/0897 |
| 2020/0036510 A1 * | 1/2020 | Gomez | G06N 3/045 |
| 2020/0044862 A1 | 2/2020 | Yadlin | |
| 2020/0104670 A1 | 4/2020 | Seo | |
| 2020/0125933 A1 * | 4/2020 | Aldea Lopez | G06N 3/063 |
| 2020/0158745 A1 | 5/2020 | Tian | |
| 2020/0167127 A1 | 5/2020 | Lokappa | |
| 2020/0167834 A1 | 5/2020 | Matsuoka | |
| 2020/0184044 A1 | 6/2020 | Zatloukal | |
| 2020/0186528 A1 | 6/2020 | Fan | |
| 2020/0193279 A1 | 6/2020 | Hostetler | |
| 2020/0202184 A1 | 6/2020 | Shrestha | |
| 2020/0226284 A1 | 7/2020 | Yin et al. | |
| 2020/0228313 A1 | 7/2020 | Storm | |
| 2020/0242492 A1 | 7/2020 | Goel | |
| 2020/0265301 A1 | 8/2020 | Burger | |
| 2020/0286145 A1 | 9/2020 | Storm | |
| 2020/0296128 A1 | 9/2020 | Wentz | |
| 2020/0304293 A1 | 9/2020 | Gama | |
| 2020/0322141 A1 | 10/2020 | Kinjo | |
| 2020/0342288 A1 | 10/2020 | Xi | |
| 2020/0342394 A1 | 10/2020 | Moore et al. | |
| 2020/0358599 A1 | 11/2020 | Baracaldo Angel | |
| 2020/0364608 A1 | 11/2020 | Anwar | |
| 2020/0372360 A1 | 11/2020 | Vu | |

(56) References Cited

U.S. PATENT DOCUMENTS

| | | |
|---|---|---|
| 2020/0387797 A1 | 12/2020 | Ryan et al. |
| 2020/0394316 A1 | 12/2020 | Boehler |
| 2020/0402625 A1 | 12/2020 | Aravamudan |
| 2021/0019605 A1 | 1/2021 | Rouhani |
| 2021/0026860 A1 | 1/2021 | Wang |
| 2021/0035330 A1 | 2/2021 | Xie |
| 2021/0064760 A1 | 3/2021 | Sharma |
| 2021/0073036 A1 | 3/2021 | Kim |
| 2021/0089878 A1 | 3/2021 | Greenwald |
| 2021/0117578 A1 | 4/2021 | Cheruvu |
| 2021/0142177 A1 | 5/2021 | Mallya |
| 2021/0150024 A1 | 5/2021 | Zhang |
| 2021/0157912 A1 | 5/2021 | Kruthiveti Subrahmanyeswara Sai |
| 2021/0192279 A1 | 6/2021 | Laaksonen et al. |
| 2021/0194668 A1 | 6/2021 | Masters |
| 2021/0209247 A1 | 7/2021 | Mohassel |
| 2021/0209514 A1 | 7/2021 | Kim et al. |
| 2021/0248268 A1 | 8/2021 | Ardhanari |
| 2021/0264271 A1 | 8/2021 | Gebre |
| 2021/0266170 A1 | 8/2021 | Rossi |
| 2021/0314140 A1 | 10/2021 | Stephenson |
| 2021/0334621 A1 | 10/2021 | Shimizu |
| 2021/0350357 A1 | 11/2021 | Lafontaine |
| 2021/0357859 A1 | 11/2021 | Malvankar |
| 2021/0374502 A1 | 12/2021 | Roth |
| 2021/0385069 A1 | 12/2021 | Reid |
| 2021/0406386 A1 | 12/2021 | Ortiz |
| 2021/0406406 A1 | 12/2021 | Hutter |
| 2022/0004654 A1 | 1/2022 | Patel |
| 2022/0012672 A1 | 1/2022 | Inman |
| 2022/0038271 A1 | 2/2022 | Ranellucci |
| 2022/0050921 A1 | 2/2022 | LaFever |
| 2022/0051276 A1 | 2/2022 | Zelocchi |
| 2022/0108026 A1 | 4/2022 | Ortiz |
| 2022/0121731 A1 | 4/2022 | Growth |
| 2022/0247548 A1 | 8/2022 | Boehler |
| 2022/0351039 A1 | 11/2022 | Satheesh Kumar |

OTHER PUBLICATIONS

Brisimi et al. "Federated learning of predictive models from federated electronic health records", International Journal of Medical Informatics, Apr. 2018, retrieved on Jan. 18, 2021 from http://www.ncbi.nlm.nih/gov/pmc/articles/PMC5836813/pdf/nihms936798.pdf.

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004,12088v, entire document.

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

Ads et al., "Multi-limb Split Learning for Tumor Classification on Vertically Distributed Data", Date of Conference: Dec. 5-7, 2021, IEEE (Year: 2021).

Lui et al., "Federated Forest", Arxiv.org, Cornell University Library, May 24, 2019, XP081662771, DOI: 10.1109/TBDATA.2020.2992755, Sections 3, 4, 5; Figure 1. (Year: 2019).

\* cited by examiner

SYSTEMS AND METHODS FOR ENCRYPTING DATA AND ALGORITHMS

CROSS-REFERENCE TO RELATED APPLICATION

The present application is a continuation of U.S. patent application Ser. No. 16/828,085, filed Mar. 24, 2020, which claims priority to U.S. Application No. 62/948,105 filed Dec. 13, 2019, entitled "Systems and Methods for Encryption", the disclosure of which is hereby incorporated herein by reference.

RELATED APPLICATIONS

The present disclosure is related to U.S. application Ser. No. 16/828,216, U.S. application Ser. No. 16/828,354 and U.S. application Ser. No. 16/828,420 each filed on Mar. 24, 2020, and each of which is incorporated herein by reference.

TECHNICAL FIELD

The present technology pertains to encrypting data, algorithms, neural networks, and other information and performing complex operations on split or encrypted data accurately and more efficiently.

BACKGROUND

There are numerous situations where one person, entity, or company may interact with another person, entity, or company. In these situations, it may be necessary for the first entity to exchange information with the second entity and for the second entity to exchange information with the first entity in order to work on a job, project, or task. However, the first entity may want to limit the second entity from being able to view its information because it may include proprietary information. In addition, the second entity may want to limit the first entity from being able to view its information because it may include propriety information.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
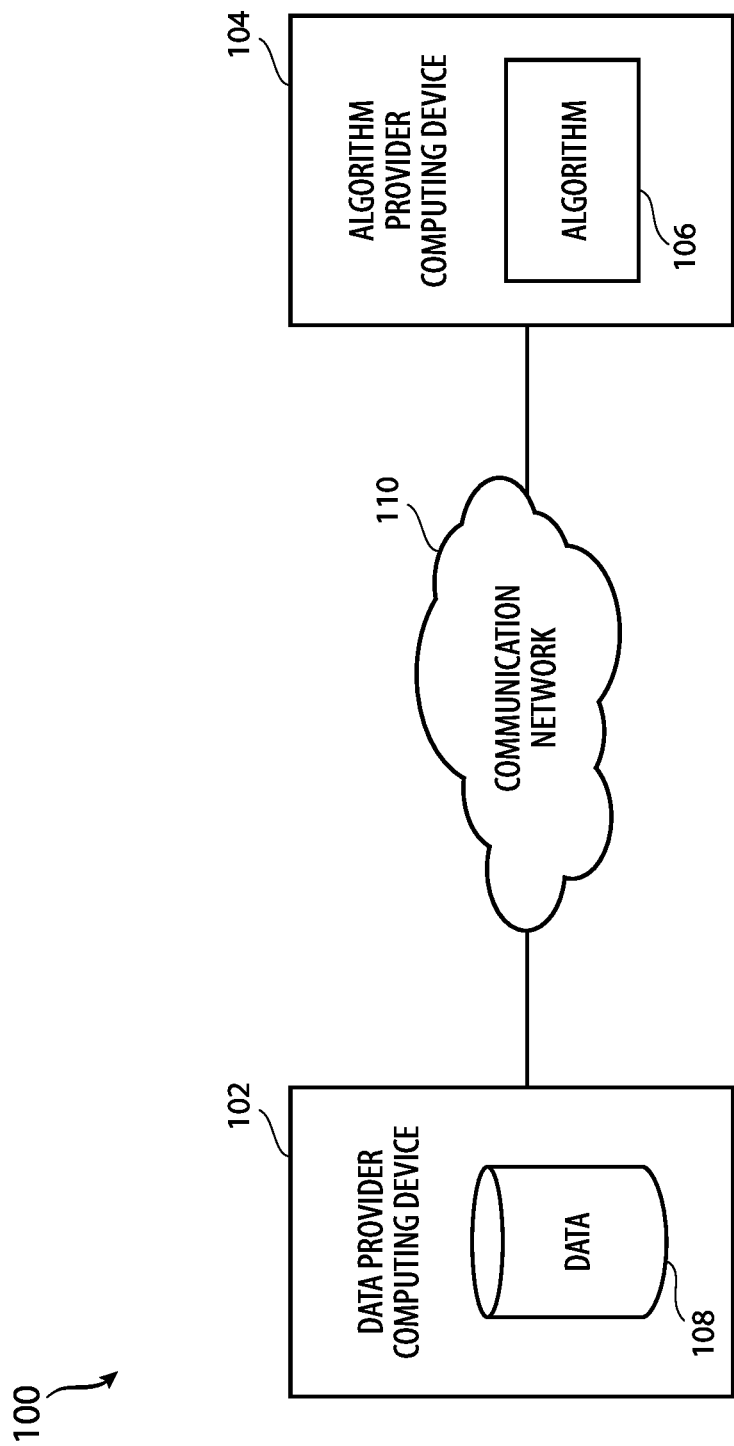
FIG. 1 illustrates an example computing environment, in accordance with various embodiments.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for encrypting data, algorithms, neural networks, and other information and performing complex operations on split or encrypted data accurately and more efficiently. According to at least one example, a system for achieving privacy for both data and an algorithm that operates on the data is provided. The system can be at least one computing device that includes a memory and at least one processor to execute instructions stored by the memory. The at least one computing device can receive an algorithm from an algorithm provider and can receive data from a data provider. The algorithm may be selected from a list of algorithms provided by the algorithm provider and the data may be retrieved by the data provider from a database. The database can be accessed from any type of memory such as a disk, RAM, cache, and so forth. In addition, the computing device may encrypt the algorithm and encrypt the data. In one example, the computing device may be a computing device associated with the algorithm provider. In another example, the computing device may be a computing device associated with the data provider. In a further example, the computing device may be a third party computing device and may not be associated with the algorithm provider or the data provider.

The following discloser describes how an algorithm that will be operating on data can be split or divided into at least two sub-portions. The data can be divided as well into sub-portions. An algorithm sub-portion operations on a data sub-portion to preserve privacy between the algorithm provider and the data provider. The process of dividing the algorithm and the processing that follows can be accomplished in a number of different ways. For example, the algorithm can be converted into a Boolean logic gate set, or could be represented as a neural network or an algebraic or non-Boolean circuit. These various approaches each apply to the more general idea of processing data via algorithms in a new way.

The at least one computing device can divide the algorithm into a first algorithm subset and a second algorithm subset and can divide the data into a first data subset and a second data subset. The at least one computing device can send the first algorithm subset and the first data subset to the algorithm provider and can send the second algorithm subset and the second data subset to the data provider. Next, the at least one computing device can receive a first partial result from the algorithm provider based on the first algorithm subset and first data subset and can receive a second partial result from the data provider based on the second algorithm subset and the second data subset. The at least one computing device can determine a combined result based on the first partial result and the second partial result.

In a further example, there can be a Boolean logic gate set associated with the algorithm. The algorithm can be converted into the Boolean logic gate set. The computing device may convert the first algorithm subset into a first Boolean logic gate subset from the Boolean logic gate set and may convert the second algorithm subset into a second Boolean logic gate subset from the Boolean logic gate set. This is the approach used for a non-neural network. The original Boolean logic gate subset(s) can include AND gates and XOR gates—the subsets are just shares of the assigned encoding. For example, if the system encodes AND gates with 1, 1, the first subset could be 0, 1 and the second subset could be 1, 0. As discussed herein, the algorithm provider may include at least one first computing device and the data provider may comprise at least one second computing device. In one example, the combined result may be sent to the data provider and the data provider may display a representation of the combined result. In another example, the combined result may be sent to the algorithm provider and the algorithm provider may display the representation of the combined result. In another example, the combined result may be sent to another computing device and the other computing device may display the representation of the combined result.

For neural networks, the disclosure introduces the concept of splitting the algorithm according to the weights, and the Boolean logic gate set is replaced by the structure of the network. Essentially, the neural network is treated as a (non-Boolean) circuit itself. In another aspect, the concept can be generalized to algebraic decomposition of an algorithm (rather than just a Boolean logic gate set decomposition of it). For example, in the case of a neural network, the system can treat the architecture of the nodes of the neural network as a circuit of its own, with the nodes representing gates and the connections between them representing wires. This disclosure also covers representing an algorithm purely in algebraic structures. Thus, an algorithm could be represented in those three ways (circuit, neural network, algebraic structures). It is further contemplated that algorithms could be converted or represented as other structures as well. This disclosure is not limited to the listed three ways of representing an algorithm.

In another example, a method for achieving privacy for both data and an algorithm that operates on the data is provided. The method can include receiving, by at least one processor, an algorithm from an algorithm provider, receiving, by the at least one processor, data from a data provider, dividing, by the at least one processor, the algorithm into a first algorithm subset and a second algorithm subset, dividing, by the at least one processor, the data into a first data subset and a second data subset, sending, by the at least one processor, the first algorithm subset and the first data subset to the algorithm provider, sending, by the at least one processor, the second algorithm subset and the second data subset to the data provider, receiving, by the at least one processor, a first partial result from the algorithm provider based on the first algorithm subset and first data subset and receiving a second partial result from the data provider based on the second algorithm subset and the second data subset, and determining, by the at least one processor, a combined result based on the first partial result and the second partial result.

An example system can include one or more processors and a computer-readable storage device that stores computer instructions which, when executed by the at least one processor, cause the processor to perform operations including receiving an algorithm from an algorithm provider, receiving data from a data provider, dividing the algorithm into a first algorithm subset and a second algorithm subset, dividing the data into a first data subset and a second data subset and sending the first algorithm subset and the first data subset to the algorithm provider. The operations further include sending the second algorithm subset and the second data subset to the data provider, receiving a first partial result from the algorithm provider based on the first algorithm subset and first data subset and receive a second partial result from the data provider based on the second algorithm subset and the second data subset and determining a combined result based on the first partial result and the second partial result.

In another example, a non-transitory computer-readable storage medium for achieving privacy for both data and an algorithm that operates on the data is provided. The non-transitory computer-readable storage medium can store instructions which, when executed by one or more processors, cause the one or more processors to perform the method and/or operations previously described. For example, the instructions can cause the one or more processors to receive an algorithm from an algorithm provider, receive data from a data provider, divide the algorithm into a first algorithm subset and a second algorithm subset, divide the data into a first data subset and a second data subset, send the first algorithm subset and the first data subset to the algorithm provider, send the second algorithm subset and the second data subset to the data provider, receive a first partial result from the algorithm provider based on the first algorithm subset and first data subset and receive a second partial result from the data provider based on the second algorithm subset and the second data subset, and determine a combined result based on the first partial result and the second partial result.

Another example method includes receiving, by at least one processor, an algorithm from an algorithm provider, receiving, by the at least one processor, data from a data provider, dividing, by the at least one processor, the algorithm into a first algorithm subset and a second algorithm subset, and dividing, by the at least one processor, the data into a first data subset and a second data subset. The method can include processing, by the at least one processor, the first algorithm subset and the first data subset and processing, by the at least one processor, the second algorithm subset and the second data subset. The method can also include receiving, by the at least one processor, a first partial result based on the first algorithm subset and first data subset and receiving a second partial result based on the second algorithm subset and the second data subset and determining, by the at least one processor, a combined result based on the first partial result and the second partial result.

Another aspect of this disclosure relates to providing additional efficiency when processing the data subsets by the algorithm subsets. The algorithm is split into two portions and then distributed between the two parties in a transaction. Control bits will be used between the two different spots or locations performing the calculations on the different data subsets and algorithm subsets that ultimately decipher what the actual final evaluation is of the circuits.

One approach disclosed herein uses Beaver sets to allow for multiplications with fewer communication hops by moving it to the preprocessing steps. A beaver set is employed at time of calculation (e.g., after the algorithm has been encrypted and/or distributed) to reduce the amount of exchanges between devices or the different locations where computations are occurring. The approach allows more calculations to be performed faster before an exchange is needed. The approach is described in the context of filters in various layers of a neural network.

An example method includes dividing, via one or more computing devices, a plurality of filters in a first layer of a neural network into a first set of filters and a second set of filters, applying, via the one or more computing devices, each of the first set of filters to an input of the neural network to yield a first set of outputs, and obtaining a second set of outputs associated with the second set of filters, the second set of outputs being based on an application of each of the second set of filters to the input of the neural network. For each set of filters in the first set of filters and the second set of filters that corresponds to a same filter from the plurality of filters, the method includes aggregating, via the one or more computing devices and at a second layer of the neural network, a respective one of the first set of outputs associated with a first filter in the set of filters with a respective one of a second set of outputs associated with a second filter in the set of filters to yield a set of aggregated outputs associated with the first set of filters and the second set of filters.

The method further includes splitting, via the one or more computing devices, respective weights of specific neurons activated in each remaining layer of the neural network to yield a first set of weights and a second set of weights, the specific neurons being activated based on one or more activation functions applied to the set of aggregated outputs. At each specific neuron from each remaining layer, the method includes applying, via the one or more computing devices, a respective filter associated with each specific neuron and a first corresponding weight from the first set of weights to yield a first set of neuron outputs, obtaining a second set of neuron outputs associated with the specific neurons, the second set of neuron outputs being based on an application of the respective filter associated with each specific neuron to a second corresponding weight from the second set of weights, for each specific neuron, aggregating one of the first set of neuron outputs associated with the specific neuron with one of a second set of neuron outputs associated with the specific neuron to yield aggregated neuron outputs associated with the specific neurons and generating an output of the neural network based on one or more of the aggregated neuron outputs. The above method can include any one or more of the identified steps in any order.

In one example, the use of Beaver sets (or similar mathematical structures) can be used to reduce the amount of calculations that are needed to split the algorithms and data and perform the operations disclosed herein. Beaver sets have typically been used in the past to perform multiplications securely. This disclosure extends the state of the art by applying Beaver sets in a new way to achieve multiplications with fewer communication hops. Beaver sets in general are used to compute multiplications. This disclosure expands the use of the Beaver set to apply them to division and exponential computations. An example method includes each party or entity receiving an algorithm subset, generating by a first party, two shares of first Beaver sets based on a nature of the first algorithm (or other factors), generating by a second party, two shares of second Beaver sets based on a nature of the second algorithm subset (or other factors) and then providing a first data subset to the first party and a second data subset to the second party and running the first algorithm subset on the first data subset based on the two shares of the first Beaver sets to obtain a first output subset and running the second algorithm subset on the second data subset based on the two shares of second Beaver sets to obtain a second output subset. The system then combines the first output subset and the second output subset as the final result.

This brief introduction is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

The disclosed technology involves systems, methods, and computer-readable media for encrypting data, algorithms, neural networks, and other information and performing complex operations on split or encrypted data accurately and more efficiently. The present technology will be described in the following disclosure as follows. The discussion begins with an introduction to the general scenario where this technology can apply and then an overview of multiparty computation.

One example scenario where the concepts disclosed herein could apply is in a medical context. Personal medical data is protected by laws such as HIPAA (Health Insurance Portability and Accountability Act). In some cases, convolutional neural networks (CNNs) are valuable for identifying patterns in images. A patient may need to have an electrocardiogram (EKG) evaluated. Normally, the CNN (algorithm) "sees" the EKG data which can lead to an identification of the patient. In another aspect, the characteristics of a proprietary CNN may also be obtained from the person providing the data. Companies may not only want to protect patient data from identification but also will want to protect their proprietary algorithms from discovery. The concepts disclosed herein enable an algorithm to operate on data in a way that protects both the data and the algorithm from identification. This disclosure will address various scenarios such as medical, credit card, insurance, and so forth more fully below.

A description of an example multiparty computing environment, as illustrated in FIG. 1, and a description of example methods and techniques for achieving privacy for both data and an algorithm that operates on the data is provided, as illustrated in FIGS. 2 through 9B, will then follow. FIGS. 9C-12 provide further illustrations of embodiments disclosed herein, including convolutional neural networks and flow diagrams of various methods related to achieving privacy both for algorithms and data in an efficient manner. The discussion concludes with a description of an example computing device architecture including example hardware components suitable for performing multiparty computing operations, as illustrated in FIG. 13. In one aspect, standard or unencrypted algorithms can also be processed with secure multiparty computation as well. This is in addition to the use of homomorphic encryption, secure element (hardware based or otherwise)—based approaches as described herein. By using encrypted, standard, algorithms, the system can interact with data that's homomorphically encrypted (not using secure multiparty computation) or even using a secure enclave. The disclosure now turns to an introductory overview of multiparty computation.

As shown in FIG. 1, the approaches herein provide a system and/or process for hiding or encrypting an algorithm 106 from a data provider 102 that provides data 108 to the algorithm 106 and hiding or encrypting the data 108 from an algorithm provider 102 that provides the algorithm 106 that operates on the data 108. In some examples, the algorithm 106 may be split or divided between at least one party that jointly executes the algorithm. In addition, in some examples, the data 108 may be split or divided between at least one party. A communication network 110 in one aspect can be configured between the data provider 102 and the algorithm provider 104. The system discussed herein may achieve privacy by cryptography for both data and algorithms that operate on the data. As an example, a proprietary algorithm 106 provided by a first party may be kept private from a second party and proprietary data 108 from the second party may be kept private from the first party. In another example, a third party may be involved.

As an example, secure multi-party computation (MPC) may allow operation of a function on two datasets without the owner or custodian of each dataset obtaining any proprietary information. MPC is based on a number of cryptographic tools and strategies such as secret sharing. As an example, a first party may be in possession of data that represents a number such as ten. The number ten may be represented using multiple numbers such as the operation six plus four. A second party may be in possession of data that represents a number such as five. The number five may be represented using multiple numbers such as the operation seven plus negative two. As an example, the first party and the second party can perform an operation on the data, such as addition, without identifying the data.

The first party may send some of their data to the second party and the second party may send some of their data to the first party. The first party may send one of the two numbers that represents the data, e.g., four, to the second party. The second party may send one of the two numbers that represents the data, e.g., seven, to the first party. The first party may add the remaining number, e.g., six, with one of the two numbers from the second party, e.g., seven, to determine a total of thirteen. The second party may add the remaining number, e.g., negative two, with one of the two numbers from the first party, e.g., four, to determine a total of two. Either the first party or the second party may add the totals together to determine a result of fifteen.

Secure multi-party computation as discussed herein is based on an example protocol and provides a number of advantages in a number of scenarios such as the scenarios discussed below. In one example as noted above, a doctor may obtain data associated with a patient such as electrocardiogram (EKG) information. Conventionally, a doctor may have analyzed the EKG information and made a diagnosis as to whether there was any abnormality in the EKG information. The abnormality may indicate that there are one or more conditions associated with the patient such as atrial fibrillation. It can be very difficult to make such a determination. However, there are ways to improve the diagnosis and each patient may have certain attributes that makes each diagnosis different from one another. As an example, an age of a patient, a gender of a patient, and other information may be relevant to a diagnosis. The doctor can utilize multiparty computation to possibly improve the diagnosis.

The doctor may represent the first party and may wish to communicate with a second party that has access to an algorithm to perform a more in-depth analysis of the data. The data may include identifying information associated with the patient. The second party may be an algorithm holder that performs analysis of the EKG information by comparing the EKG information with a library of EKG information and determines whether there may be the abnormality associated with a patient. A CNN may be the algorithm to evaluate the EKG information. As an example, the second party may be able to perform image analysis by comparing the EKG information of the patient with each instance of EKG information in the library. This may allow the doctor to provide a more accurate diagnosis by comparing the EKG information with the library of EKG information. In another aspect, the owner or entity that offers the CNN for analysis of EKG information may not want the details regarding their algorithm to be disclosed or made public. The approach disclosed herein enables the data to be processed by an algorithm in a particular technical manner that protects both the data and the algorithm from being identifiable to the other party while the data is being processed.

The example above is not limited to analysis of EKG information. In another example, the doctor may obtain a medical image that represents the patient such as an x-ray, a magnetic resonance imaging (MRI) image, a computed tomography (CT) scan, or another type of image. The doctor may obtain the medical image and want to perform a diagnosis based on the medical image. The doctor can utilize multiparty computation to possibly improve the diagnosis. The doctor may represent the first party and may wish to communicate with a second party that has access to an algorithm to perform an in-depth analysis of the data. As an example, the second party may be an algorithm holder that performs analysis of the medical image by comparing the medical image with a library of medical images and determines whether there may an abnormality associated with the patient. The algorithm can be a CNN or a machine learning or artificial intelligence system trained on various medical images for the purpose of diagnosing problems with presented medical data. The systems and methods discussed herein may allow the doctor to communicate the medical image with the algorithm holder in a way that maintains the privacy of the patient as well as the privacy of the algorithm holder. The identifying data and the medical image associated with the patient may be HIPAA-protected data. In the same way, the algorithm holder may perform the analysis on the medical image without sharing the algorithm with the doctor such that the algorithm remains proprietary.

In another example, a retail location may have a customer that wishes to open a credit account and the customer may be asked to provide data associated with the customer such as a name, an address, and unique identifying information that represents the customer such as a social security number. The retail location may be a first party. Although the retail location may be able to analyze the data, it may be possible to perform a more thorough analysis of the data by obtaining access to additional information and algorithms. The retail location can utilize multiparty computation to possibly improve the analysis. The retail location may wish to communicate with a second party that has access to one or more algorithms to perform an in-depth analysis of the customer data and determine whether to open the credit account. The systems and methods discussed herein may allow the retail location to communicate the customer data with the algorithm holder in a way that maintains the privacy of the customer. In the same way, the algorithm holder may perform the analysis on the customer data without sharing the algorithm with the retail location such that the algorithm remains proprietary.

As another example, a customer may be in the process of obtaining insurance such as vehicle insurance or property insurance. The customer may be asked to provide data associated with the customer such as a name, an address, and unique identifying information that represents the customer such as a social security number. An insurance agent may be a first party. Although the insurance agent may be able to analyze the data, it may be possible to perform a more thorough analysis of the data by obtaining access to additional information and algorithms. The insurance agent can utilize multiparty computation to possibly improve the analysis. The insurance agent may wish to communicate with a second party that has access to one or more algorithms to perform an in-depth analysis of the customer data and determine whether to provide the customer with insurance. The systems and methods discussed herein may allow the insurance agent to communicate the customer data with the algorithm holder in a way that maintains the privacy of the customer. In the same way, the algorithm holder may perform the analysis on the customer data without sharing the algorithm with the insurance agent such that the algorithm remains proprietary.

As noted above, FIG. 1 illustrates an example computing environment 100, in accordance with some examples. As shown in FIG. 1, the example computing environment may include at least one data provider computing device 102 and may include at least one algorithm provider computing device 104. The at least one algorithm provider computing device 104 may have access to and/or may store information associated with one or more algorithms 106. The at least one data provider computing device 102 may have access to and/or may store data 108. The data 108 may be stored in one or more databases. The at least one data provider computing device 102 may communicate with the at least one algorithm provider computing device 104 using a communication network 110.

The at least one data provider computing device 102 is configured to receive data from and/or transmit data to the at least one algorithm provider computing device 104 through the communication network 110. Although the at least one data provider computing device 102 is shown as a single computing device, it is contemplated that the at least one data provider computing device 102 may include multiple computing devices.

The communication network 110 can be the Internet, an intranet, or another wired or wireless communication network. For example, the communication network 110 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one data provider computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of an application. In addition, the at least one data provider computing device 102 further includes at least one communications interface to transmit and receive communications, messages, and/or signals.

The at least one algorithm provider computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of an application. In addition, the at least one algorithm provider computing device 104 further includes at least one communications interface to transmit and receive communications, messages, and/or signals.

The at least one data provider computing device 102 can be a laptop computer, a smartphone, a personal digital assistant, a tablet computer, a standard personal computer, or another processing device. The at least one data provider computing device 102 may include a display, such as a computer monitor, for displaying data and/or graphical user interfaces. The at least one data provider computing device 102 may also include an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one algorithm provider computing device 104 can be a laptop computer, a smartphone, a personal digital assistant, a tablet computer, a standard personal computer, or another processing device. The at least one data provider computing device 102 may include a display, such as a computer monitor, for displaying data and/or graphical user interfaces. The at least one algorithm provider computing device 104 may also include an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

A computing device(s) which operates to implement the algorithm or algorithms disclosed herein for processing data by a proprietary algorithm is considered a special purpose computing device. For example, a computing device performing the algorithm described in connection with FIG. 13 is a special-purpose computing device as defined by the steps or operations that the computing device is programmed to perform.

Figure 2:
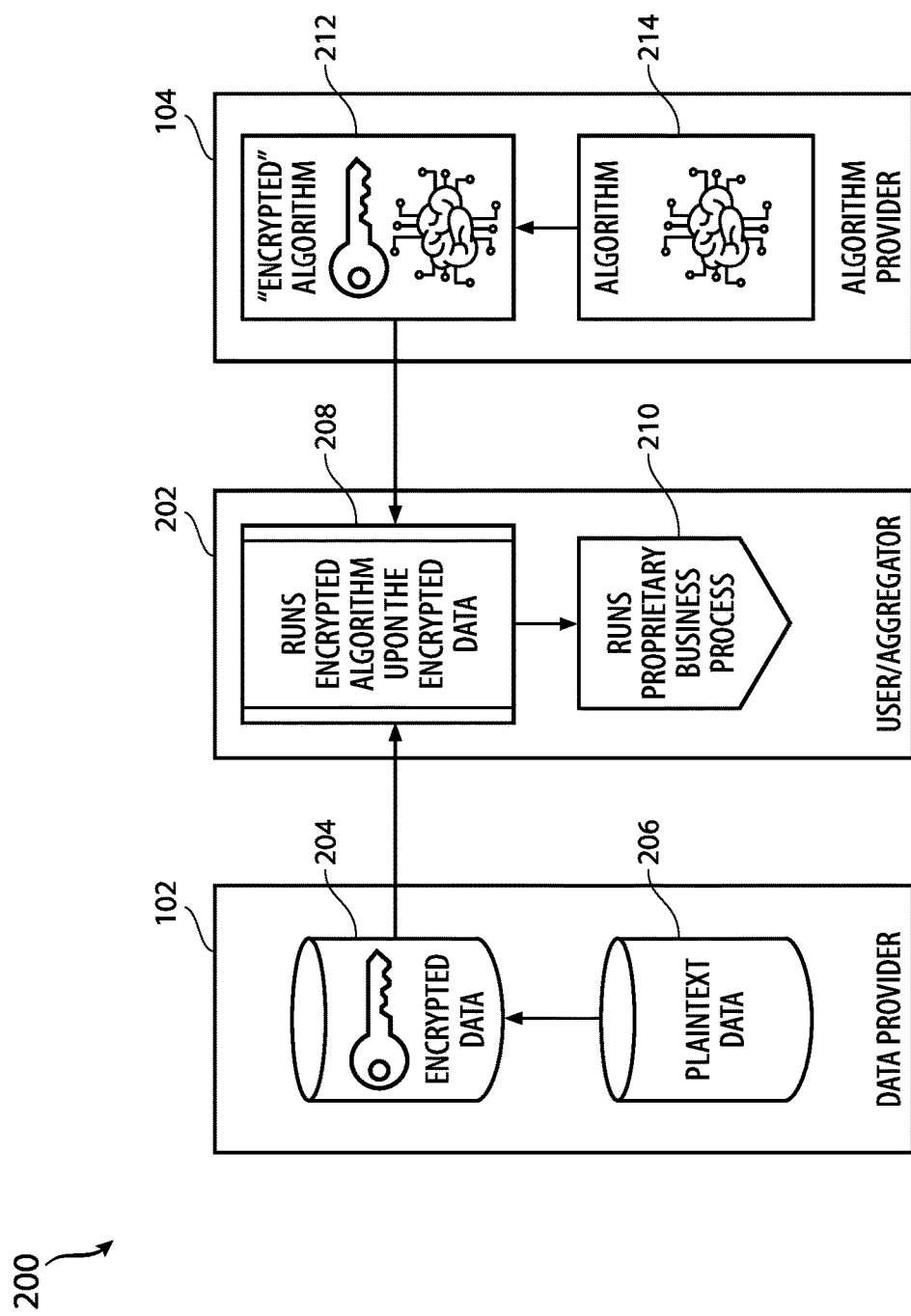
FIG. 2 illustrates a data provider and an algorithm provider, in accordance with various embodiments.

FIG. 2 illustrates another representation 200 of the example computing environment 100. As shown in FIG. 2, the at least one data provider computing device 102 may have access to and/or store plaintext data 206. The at least one data provider computing device 102 may encrypt the plaintext data into encrypted data 204. In addition, the at least one algorithm provider computing device 104 may have access to and/or store an algorithm 214. The at least one algorithm provider computing device 104 may encrypt the algorithm to yield an encrypted algorithm 212. The at least one data provider computing device 102 may send the encrypted data 204 to the user or aggregator 202. In addition, the at least one algorithm provider computing device 104 may send the encrypted algorithm 212 to the user or aggregator 202. The user or aggregator 202 may run the encrypted algorithm on the encrypted data 208 to perform a proprietary process 210. The user or aggregator 202 may be the at least one data provider computing device 102, but the user or aggregator 202 may be a different entity. In another example, the user or aggregator 202 may be the algorithm provider computing device 104. Although the algorithm provider has encrypted the algorithm in this example, this is optional. In addition, although the data provider has encrypted the data in this example, this is optional. If the algorithm and/or the data is not encrypted, this may allow for performance improvements such that the algorithm may be executed proportionally faster.

In one example, the aggregator 202 can be considered an entity that enables algorithm providers such as entities that have developed a proprietary convolution neural network (CNN) to provide that algorithm for evaluating EKGs in a proprietary way as disclosed herein such that the aggregator 202 can receive EKG data from a doctor, process the EKG data and provide the output to the designated recipient of the output data. In this manner, the aggregator 202 can operate a "marketplace" where data and algorithms can perform together under a configuration that enables privacy to be maintained for both the data and the algorithms.

Figure 3:
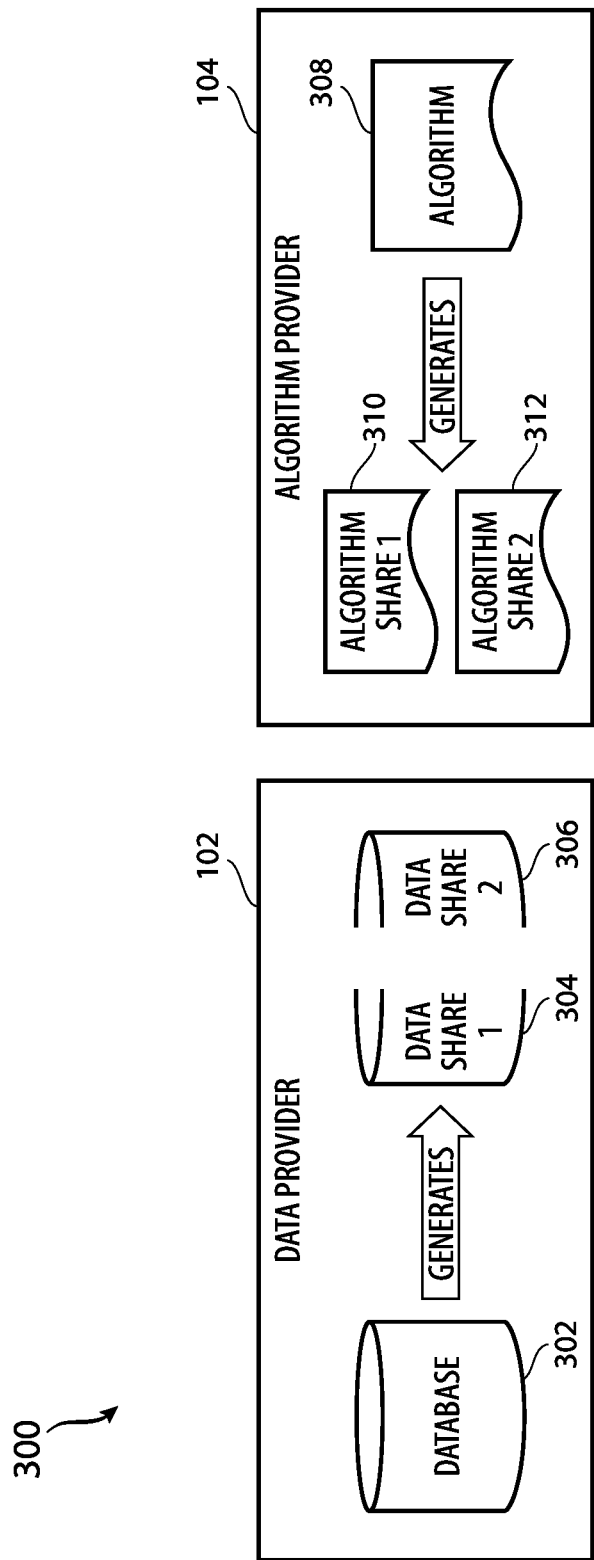
FIG. 3 illustrates the data provider dividing data and the algorithm provider dividing an algorithm, in accordance with various embodiments.

FIG. 3 illustrates the data provider computing device 102 dividing the data and the algorithm provider computing device 104 dividing the algorithm to setup a secure multi-party computation approach, in accordance with various embodiments. As shown in FIG. 3, the data provider computing device 102 can retrieve the data from a database 302 and perform an operation to divide the data into a first subset or first share 304 and a second subset or second share 306. In addition, as shown in FIG. 3, the algorithm provider computing device 104 may obtain the algorithm 308, which can be a representation of the algorithm in a Boolean logic gate set form in which the original algorithm is binarized, anonymize the algorithm 309, and perform an operation to divide the algorithm 309 into a first subset or first algorithm 310 and a second subset or second algorithm 312. For example, the system first converts the algorithm to a Boolean logic set 309, which then can be split into a first Boolean logic subset 310 and a second Boolean logic subset 212. A computing device can perform operations by reducing computer-readable instructions into binary decisions or Boolean logic operations or gates 309. Thus, the data provider computing device 102 and the algorithm provider computing device 104 may reduce the algorithm into an emulated circuit or virtualized circuit that represents the data and/or the algorithm and can anonymize the circuit. In another example, the circuit may be represented by hardware. As an example, the first subset of data and the second subset of data may be a nonsensical split of data. In addition, the first subset of the algorithm 310 and the second subset of the algorithm 312 may be a nonsensical split. The two parties may operate on their respective splits of the algorithm. Neither party executes the entire algorithm on the entire set of data and does not understand what the entire algorithm determines. The splitting of the data and/or the splitting of the algorithm can occur on any of the components disclosed herein. For example, an entity might provide programming to a data provider 102 which can preprocess or prepare the data in terms of one or more of encryption and data splitting before the data is transmitted to the entity such as the aggregator 202. The aggregator might simply receive the data and perform the encryption and splitting on its compute systems as well. Similar processes can occur for the algorithm provider 104.

Figure 4A:
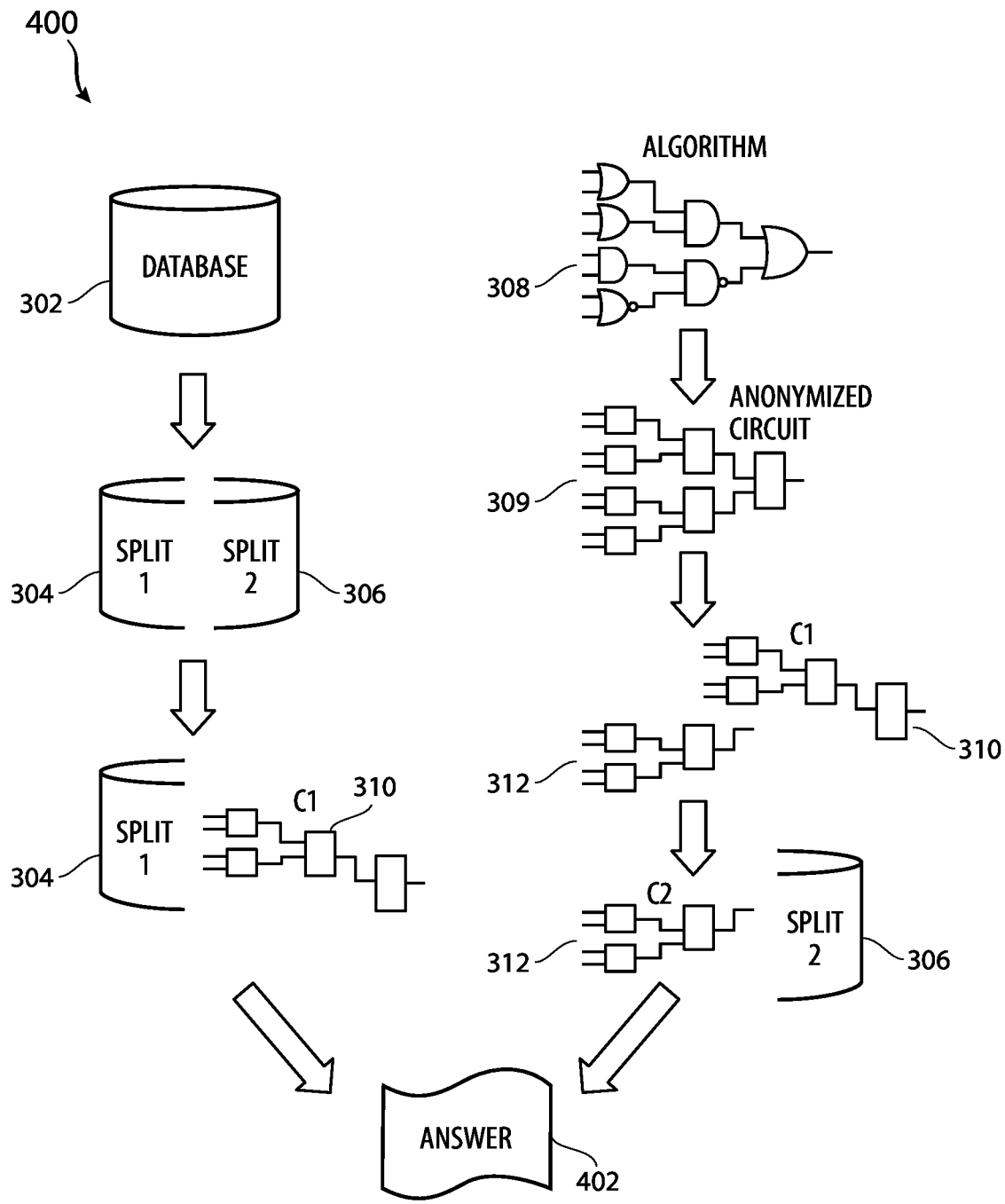
FIG. 4A illustrates the data provider and the algorithm provider jointly computing an algorithm, in accordance with various embodiments.

FIG. 4A illustrates a computing device processing the algorithm 308 in its Boolean logic gate set form and the data 302, in accordance with various embodiments. As an example, the database 302 may be divided into the first subset of data 304 and the second subset of data 306. In addition, the algorithm 308 may be converted into an anonymized circuit (Boolean logic gate set 309) and then divided into a first subset of the algorithm (by dividing the Boolean logic gate set 309 into a first Boolean logic gate subset) 310 and a second subset of the algorithm (by dividing the Boolean logic gate set 309 into a second Boolean logic gate subset) 312. The data provider computing device 102 may send the second subset of data to the algorithm provider computing device 104 or to an aggregator 202. The algorithm provider computing device 104 may send the first subset of the algorithm 310 to the data provider computing device 102 or to the aggregator 202. The data provider computing device 102 or the aggregator 202 may perform the first subset of the algorithm 310 on the first subset of data 304. In addition, the algorithm provider computing device 104 or the aggregator 202 may perform the second subset of the algorithm 312 on the second subset of data 306. The data provider computing device 102 and the algorithm provider computing device 104 (or the aggregator 202) may merge their partial results together to form a final result or answer 402.

As outlined above, the context of this disclosure related to a Party A having a database that contains some private information that they are not allowed to share with other parties. Party B has an algorithm and for some security reasons, Party B cannot share or disclose its algorithm. To address this issues arising out of this context, there are some available solutions. For example: if party A is a hospital and party B has a cancer diagnostic algorithm, party A can send the encrypted version of patients medical records and party B can apply the algorithm homomorphically on party A's inputs and send the results back to party A. At the end, party A will decrypt the results. In another scenario, assume party A has a face data set and party B wants to train a model based on party A's database. Secure Multi-party computation (SMPC) is a possible solution. However, the downside of MPC is that party A will learn information about the trained algorithm of party B. Disclosed herein is a new SMPC scheme which is faster than previous schemes. Also disclosed is a new circuit hiding scheme which is turning gate information into inputs to the circuit. The idea of the disclosed SMPC is to use Chinese Remainder Theorem in a polynomial ring to keep the degree of the polynomial low so that after computations, the resulting polynomial would be reconstructable. This approach also ensures that Party A learns nothing about the algorithm of Party B. These ideas are developed next.

Figure 4B:
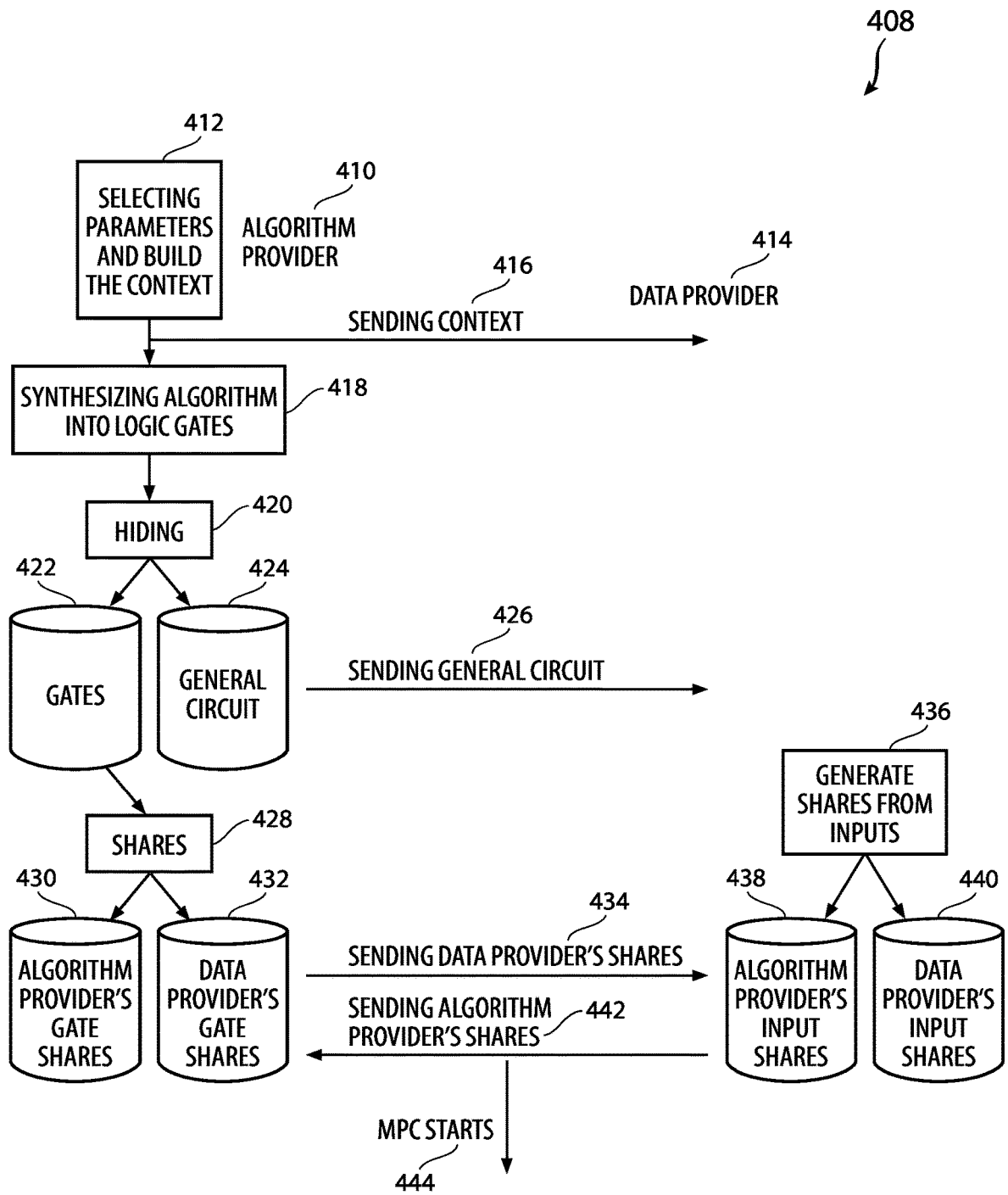
FIG. 4B illustrates communication of information between the data provider and the algorithm provider.

FIG. 4B illustrates 408 the interaction between algorithm provider 410 and a data provider 414. The algorithm provider 410 selects parameters and builds a context associated with the processing of data using the algorithm. The context 416 is communicated to the data provider 414. The algorithm provider synthesizes the algorithm into logic gates 418 and "hides" the algorithm 420 using the principles disclosed herein, such as in FIG. 7. The result of the hiding process includes gates 422 and a general or generic circuit 424. The algorithm provider 410 sends the general circuit 426 to the data provider 414. Next, the algorithm provider generates shares 428 as disclosed herein and the data provider 414 generates shares from the inputs 436. The algorithm provider 410 sends shares 434 to the data provider 414 and the data provider 414 sends shares 442 to the algorithm provider 410. The algorithm provider 410 performs a process using the algorithm provider's gates shares 430 and the data provider's gates shares 432. The data provider 414 performs a process using the algorithm provider's input shares 438 and the data provider's input shares 440. After the generation of the algorithm provider shares from the data provider's inputs, the two parties are ready to start the MPC protocol. See FIG. 6 and associated discussion herein.

Figure 7:
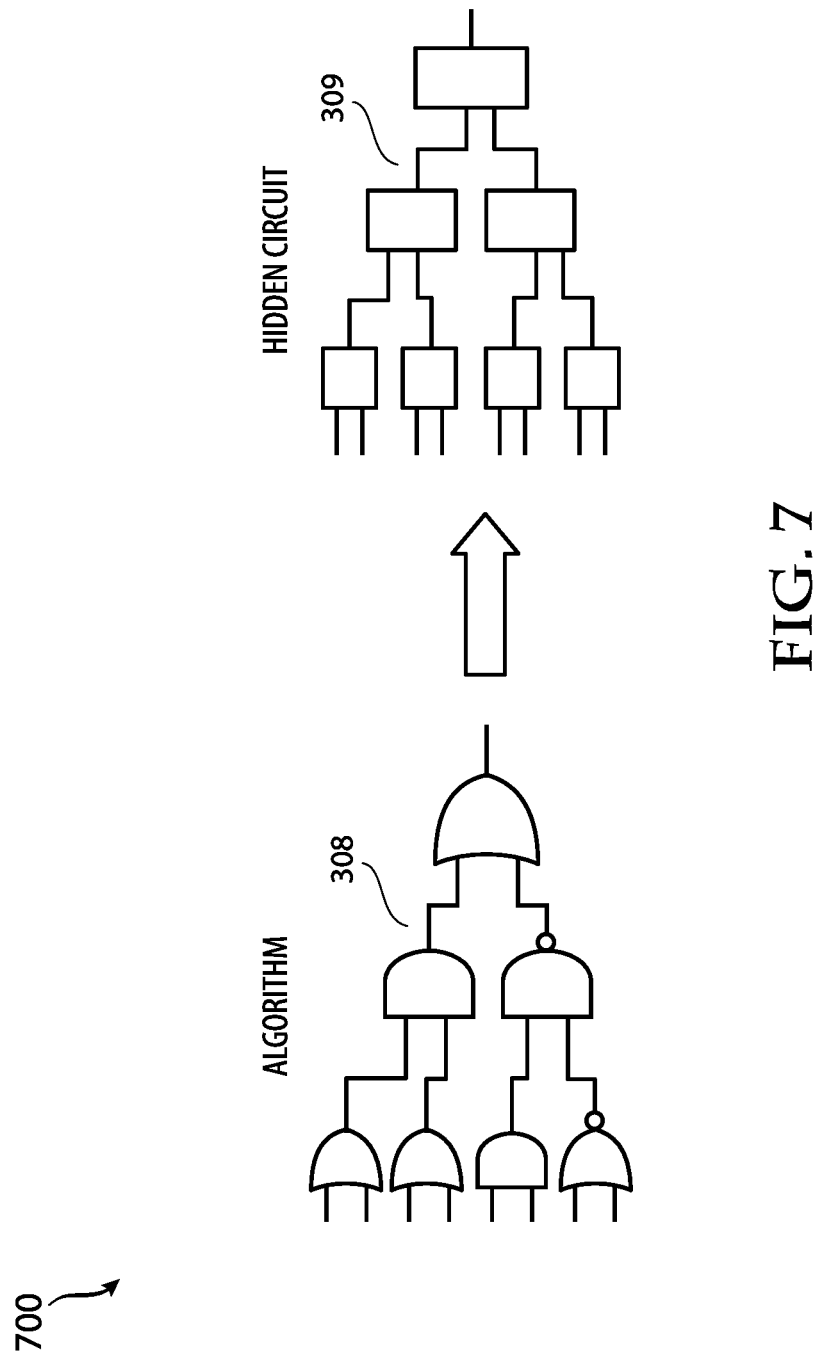
FIG. 7 illustrates an example algorithm converted into a hidden circuit, in accordance with various embodiments.

The "hiding" occurs as the algorithm provider replaces each gate in the anonymized circuit with a generic circuit and generates the function "general circuit" 424 and stores the information of each gate in a separate table. By replacing each gate with the generic circuit, the circuit is hidden and most of the information of the circuit is transferred to a gates table. What is left is just the location of each gate as is shown in FIG. 7. The hidden circuit 702 in FIG. 7 illustrates an example of what is public and as it could confirm only the location of each gate. The general structure of the circuit is revealed. The security of this approach depends on the security of the MPC method which is used on top of the circuit hiding method as the information regarding each gate is separately stored in the gates table. The computed output of each gate by the other party could not be used to reverse engineer the circuit because the actual output of each gate is not available to the other party and only some part of it is available. The circuit provider only allows the possibility of computing the output of those gates.

One of the issues with MPC is the number of communications between different parties. MPC protocols can involve many communications during the computation. The main reason for that is the "multiplication" or "AND" operation computation complexity. Using the Beaver Triplet is one practical way to handle a multiplication (AND Gate). However, that approach adds some preprocessing computations to the protocol and needs two communications for each multiplication, the same issue for GMW (Goldreich-Micali-Wigderson) protocol.

Disclosed herein is a system that supports addition and multiplications on shares of data without any communications. In other words, if the system splits a dataset A into A1, A2 and splits another dataset B into B1, B2, how does the system efficiently compute A*B. The most desirable solution can compute A*B using A1*B1 and A2*B2 and while also being able to compute A+B using A1+B1 and A2+B2. Currently there are no SMPC schemes that can do so.

GMW only supports addition and requires online communications to compute multiplications. The reason that GMW doesn't support multiplications is the fact that if the system adds two polynomials, the degree of the polynomials doesn't increase, but if the system multiplies two polynomials, the degree increases, so GMW requires communications to keep the degree of the polynomial low. The main idea of this disclosure is to use a quotient polynomial ring to keep the degree of the polynomial low to be able to reconstruct it using available points (Lagrange polynomial reconstruction). The Chinese Remainder Theorem (CRT) provides a strong tool to compute the reduction of any arbitrary polynomials to the principal ideal (if the principal ideal has enough roots) by knowing the roots of the principal ideal.

The BGW (Ben-Or, Goldwasser, Wigderson) protocol builds on the GMW protocol and considers secure multi-party computation in the computational setting. The BGW protocol uses the polynomial secret sharing idea which naturally supports homomorphic calculations. If the system stores data in some polynomials as the constant values of those polynomials, after multiplying two polynomials, the stored data can be expected to be multiplied.

For example, consider the following two data sets:
Data A: 4 corresponding polynomial: $P_1(x)=2x^2+3x+4$
Data B: 7 corresponding polynomial: $P_2(x)=x+7$
Multiplying $p_1$ and $p_2$ provides the following: $p_1*p_2=2x^3+17x^2+25x+28$. It could be confirmed that the constant value of $p_1*p_2$ is indeed equal to Data A*Data B=28. But the problem is the degree of the polynomial has increased and the system would need more points to reconstruct the final polynomial.

The solution to the need for more data to reconstruct the final polynomial can be found in the use of a Quotient Polynomial Ring with coefficients in an integer ring because it keeps the degree of the polynomial small. Unfortunately, this approach causes two other problems. First, it doesn't preserve the constant value the same after the reduction. The second problem the system being able to reduce a secret polynomial to another polynomial when the system only has some of the points.

Consider the following as an example of the first problem:
Data A: 4 corresponding polynomial: $P_1(x)=x+4$
Data B: 7 corresponding polynomial: $P_2(x)=x+7$
Consider a Principal Ideal=$x^2+1$
coeff. modulus (q)=1001

$$p_1*p_2=x^2+11x+28=11x+27 \bmod (x^2+1)$$

So the constant value of $p_1*p_2$ mod $x^2+1$ is 27, which is not equal to 28.

But, when using the ring polynomial above, there is other information which is preserved after the reduction, namely the evaluation of the resulting polynomial at $\forall x \in Z_q$ mod and the evaluation of the ring polynomial at x. In other words, $\forall x \in Z_q$ means the evaluation of the resulting polynomial @x=the evaluation of the reduced polynomial @x (mod evaluation of the principal ideal @x).

In one example, let x=10:

$$p_1*p_2(10)=11x+27=137=36 \text{ mod } 101$$

$$p_1(10)*p_2(10)=36 \text{ mod } 101$$

101 is the evaluation of $x^2+1$ at 10

The following point is valuable and is the basis of the solution. If there is an overflow in coefficients, this fact is not valid anymore. So, if instead of coeff modulus=1001, the system uses a smaller coeff such as 17, the result would be wrong.

As an example, assume x=1 as the evaluation point and a cyclotomic polynomial order $2^k$ as the Principal Ideal.

By these decisions, the system can hide a bit into a polynomial as the sum of the coefficients and since cyclotomic polynomials order $2^k$ are going to be in form of $P_c(x)=x^{2^k}+1$, hence $P_c(1)=2$, so everything will be mod 2 as desired.

Using this approach, some information is preserved after reducing a polynomial by another polynomial, so the process needs to hide the data in a polynomial with other techniques. But, the second problem identified above still exists, which is how can a polynomial be reduced to another polynomial when only some points of it are known.

One solution to this problem can be to apply the Chinese Remainder Theorem. To make this idea more clear, this disclosure provides an example of the Chinese Remainder Theorem on a polynomial ring.

Data A: 4 corresponding polynomial: $P_1(x)=x+4$
Data B: 7 corresponding polynomial: $P_2(x)=x+7$
  Principal ideal $(I)=x^2+1$
  Quotient ring=$Z_{17}[x]/I$ $$p_1*p_2=11x+27 \text{ mod } x^2+1=11x+10 \text{ mod } (x^2+1.17)$$

The system could have calculated 11x+10 in another way:
$x^2+1=(x+4)(x+12)$ mod 17 wherein roots are 4, −4
$P_1(4)=8, P_1(-4)=0$,
$P_2(4)=11, P_1(-4)=3$ To calculate the multiplication, the system can multiply $p_1(\text{root1})*p_2(\text{root1})=A$ and $p_1(\text{root2})*p_2(\text{root2})=B$ and reconstruct the polynomial with two points (root1, A) and (root2, B). The line passing (4,88)=(4,3) and (−4,0) is 11x+10 mod 17.

This disclosure next discusses the multi-party computation (MPC) protocol in more detail. The protocol is explained between 2 parties on one bit a∈{1,0} from party A and one bit b∈{1,0} from party B to execute only one gate (XOR or AND):
  q=coeff. modulus
  n=degree of the polynomial of form $2^k$
  B=Bound for polynomial coeff.
  In the protocol any number reduced to $Z_q$ lies between $-\left[\frac{q}{2}\right]$ and $\left[\frac{q}{2}\right]$.

The protocol includes (1) based on λ (the security parameter) q, n, B are selected, (2) n roots of the polynomial $P(x)=x^n+1$ over $Z_q$ are stored in two sets $$s_1 = \left\{r_1, r_2, \ldots r_{\frac{n}{2}}\right\}, s_2 = \left\{r_{\frac{n}{2}+1}, \ldots, r_n\right\}.$$

For example, for $x^2+1$ over $Z_{17}$, $S_1=\{4\}$ and $S_2=\{-4\}$.

In step (3), party A stores a bit "a" in a polynomial order n $P_A$ such that $P_A(1) \equiv a \pmod 2$ and party B stores a bit "b" in a polynomial order n $P_B$ such that $P_B(1) \equiv b \pmod 2$. In step (4), party A stores $$S_{AA} = \left(P_A(r_1), P_A(r_2), \ldots, P_A\left(r_{\frac{n}{2}}\right)\right) \text{ and sends}$$

$$S_{AB} = \left(P_A\left(r_{\frac{n}{2}+1}\right), \ldots, P_A(r_n)\right)$$

to party B.
Further, party B stores $$S_{BB} = \left(P_B\left(r_{\frac{n}{2}}\right), P_B\left(r_{\frac{n}{2}+1}\right), \ldots, P_B(r_n)\right) \text{ and sends}$$

$$S_{BA} = \left(P_B(r_1), P_B(r_2), \ldots, P_B\left(r_{\frac{n}{2}}\right)\right)$$

to party A. In step (5), to compute (a⊕b), party A computes $S_{AA}+S_{BA}$, and Party B computes $S_{BB}+S_{AB}$. In step (6), to compute (a^b), Party A computes $S_{AA} \times S_{BA}$, and Party B computes $S_{BB} \times S_{AB}$. These are element—wise multiplications. At step (7), at the end of the computation, both parties share the final results and jointly reconstruct the resulting polynomial $P_R$ using n points $(r_1, P_{f_1}(r_1)), (r_2, P_{f_2}(r_2)) \ldots (r_n, P_{f_n}(r_n))$:

$P_{f_i}(r_i)=P_A(r_i)+P_B(r_i)$ for an XOR gate and $P_{f_i}(r_i)=P_A(r_i)*P_B(r_i)$ for an AND gate.

In step (8), to compute the final result $P_R(1) \in Z_q[X]$ mod 2 is computed.

This protocol works if there is no overflow in coefficients of the polynomials (the coefficients become greater than q). Such an overflow is likely to happen after evaluating more gates. To avoid the overflow, two methods are proposed. The first method is to choose parameters big enough to support the computation. For example, if the system computes a polynomial, say, $x^2$, modulus q should be greater than $3B^2$ where B is a bound for polynomials coefficients. It is useful that the domain of polynomials should be big enough to achieve the acceptable security.

Because of the computing limitations, the system can't just choose q as big as what might be wanted to enable the system to compute the circuit correctly. Next is proposed a method to reduce the coefficients to prevent the overflow. The disclosure notes that coefficients mentioned here are different from shares referenced elsewhere. Shares can overflow.

The proposed method involves refreshing the polynomial P. Based on Lagrange Polynomial Reconstruction which is exactly equivalent to the Chinese Remainder Theorem (CRT) in polynomial ring, assume the following equation:

$$\text{Decode (polynomial } P) = \left(\sum_{i=1}^{n} \lambda_i S_i (\text{mod } q)\right) \text{ mod } 2$$

$\lambda_i$'s are calculated easily and are public information. $S_i$'s are secret shares where half of them are kept by party A and the others are kept by party B. If they share $S_i$'s, the polynomial could be reconstructed and the bit value is revealed. Using the following protocol, two parties can refresh a polynomial. Another way of describing this process is to replace the polynomial with a new polynomial having a smaller coefficient.

In step (1), Party A computes $$a = \left(\sum_{i=1}^{\frac{n}{2}} \lambda_i S_i \bmod q\right)$$

mod 2 and generates $P_A$ s.t. $P_A(1) \equiv a \bmod 2$ s.t. $P_A$ coefficients are bounded by B and Party A computes $$S_{AA} = \left(P_A(r_1), P_A(r_2), \ldots, P_A\left(r_{\frac{n}{2}}\right)\right).$$

$$S_{AB} = (P_A(r_{n/2+1}), \ldots, P_A(r_n)) \text{ and } S_{sA} = \sum_{i=1}^{\frac{n}{2}} \lambda_i S_i (\bmod q).$$

In step (2), Party A sends, $S_{AB}$, $S_{sA}$+rand(1,0) to Party B. In step (3), Party B computes $$S_{sB} = \sum_{i=1}^{\frac{n}{2}}$$

$\lambda_i S_i (\bmod q)$ if floor $$\left(-\frac{q}{2}\right) < S_{sB} + S_{sA} + rand(0, 1) < \text{floor}\left(\frac{q}{2}\right).$$

Party B generates $P_B$ s.t. $P_B(1) \equiv b \bmod 2$, otherwise Party B generates $P_B$ s.t. $P_B(1) \in 1-b \bmod 2$ and computes $$S_{BA} = \left(P_B(r_1), P_B(r_2), \ldots, P_B\left(r_{\frac{n}{2}}\right)\right) \text{ and}$$

$$S_{BB} = \left(P_B\left(r_{\frac{n}{2}+1}\right), \ldots, P_B(r_n)\right).$$

In step (4), Party B sends $S_{BA}$ to Party A and in step (5), Party A computes $S_{BA}+S_{AA}$ and Party B computes $S_{BB}+S_{AB}$.

After running this protocol, both parties have shares of a refreshed polynomial which is decoded as the original noisy polynomial but the refreshed polynomial's coefficients are bounded by 2B.

Figure 4C:
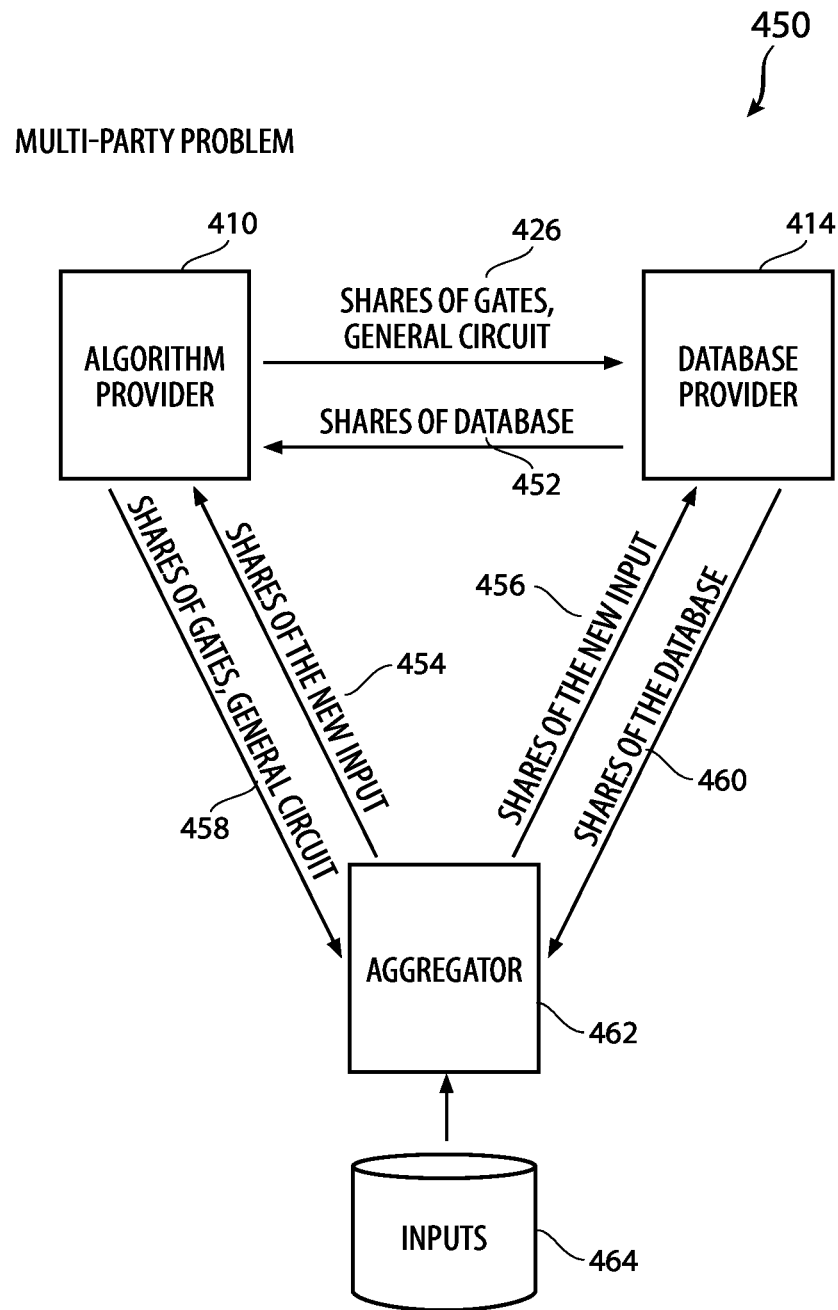
FIG. 4C illustrates communication of data between an algorithm provider, a data provider and an aggregator.

For more than two parties the idea is similar in that the same each party takes control of some roots of the ring polynomial. In the following section, this disclosure describes an application of this protocol. FIG. 4C illustrates an application 450 of the MPC to the "multi-party problem" in which there are a group of data providers 414 and an aggregator 462 who wants to perform a private function (provided by an algorithm provider 410) on new input 464 and some private database. The parties need to come to an agreement that which party takes care of which roots of the polynomial rings, then the protocol starts with the algorithm provider 410. The parties take some of the same steps as a two party problem and share "gates shares" 458 and the "general circuit" 458 to the other parties. The database provider 414 provides shares of the database 460 to the aggregator 462. The only difference between this protocol and the two-party protocol is that there are shares of the new inputs 454, 456 and evaluation of the polynomials at roots are kept by different parties.

Figure 4D:
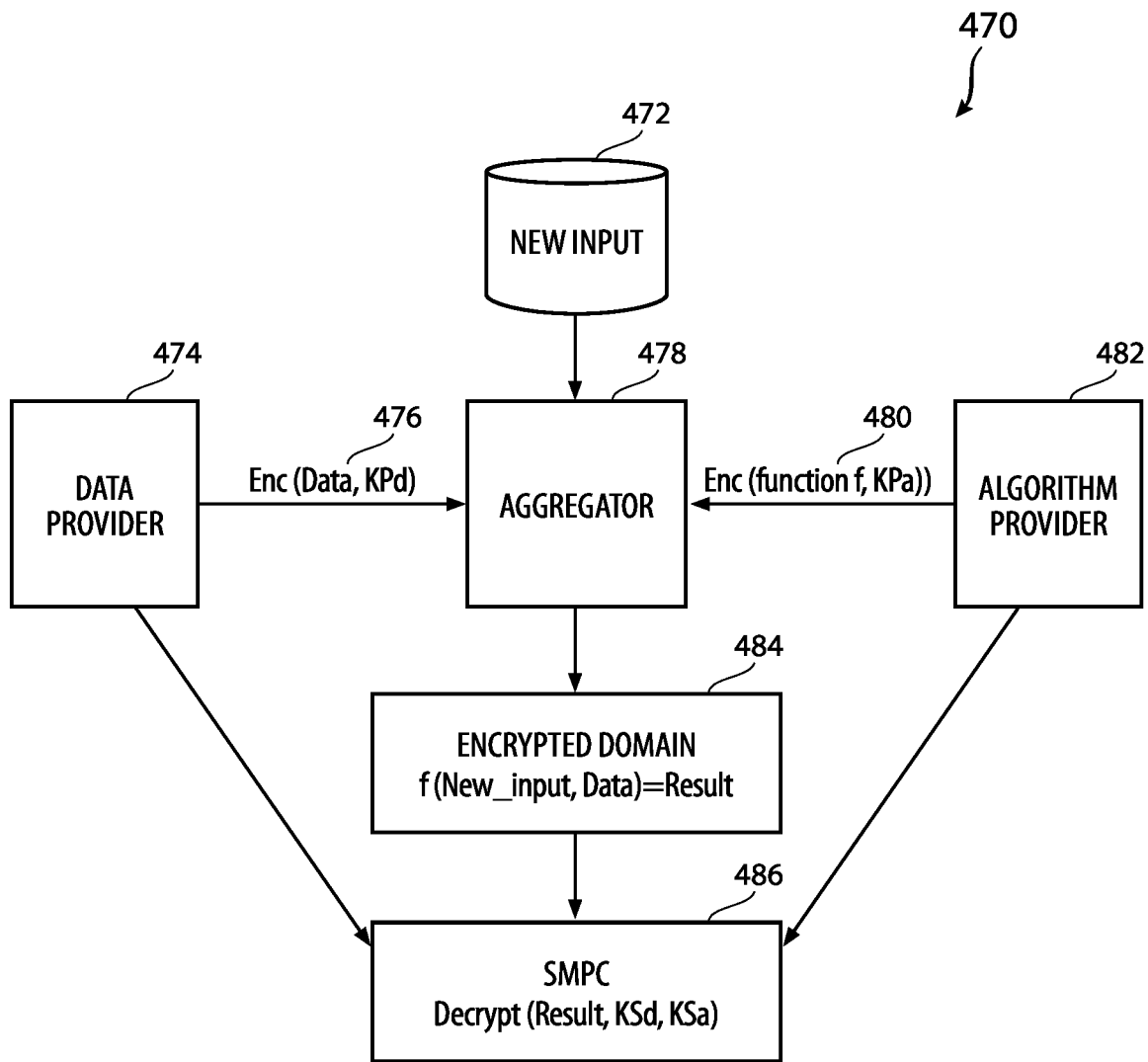
FIG. 4D illustrates communication of data between an algorithm provider, a data provider and an aggregator, including the application of a secure multi-party calculation approach.

FIG. 4D illustrates an approach 470 to applying SMPC. New input 472 is provided to an aggregator 478. The aggregator 478 receives encrypted data from a data provider 474 which uses the data provider's public key KPd 476. The aggregator also receives an encrypted function f from an algorithm provider 482 which is encrypted under the algorithm provider's public key KPa 480. Both encryptions are homomorphic encryption which enables the user to compute the encrypted results using only encrypted data, without requiring decryption. The aggregator 478 computes the result 484 using homomorphic encryption. The result can include a function result based on the new-input and the data. At the end of the computation, the data provider 474 and the algorithm provider 482 compute the decryption algorithm using SMPC. The SMPC 486 can be used to decrypt the result, the KSd and the KSa. In the SMPC protocol, the algorithm provider input is its corresponding secret key KSa and the data provider input is its secret key KSd.

Figure 5:
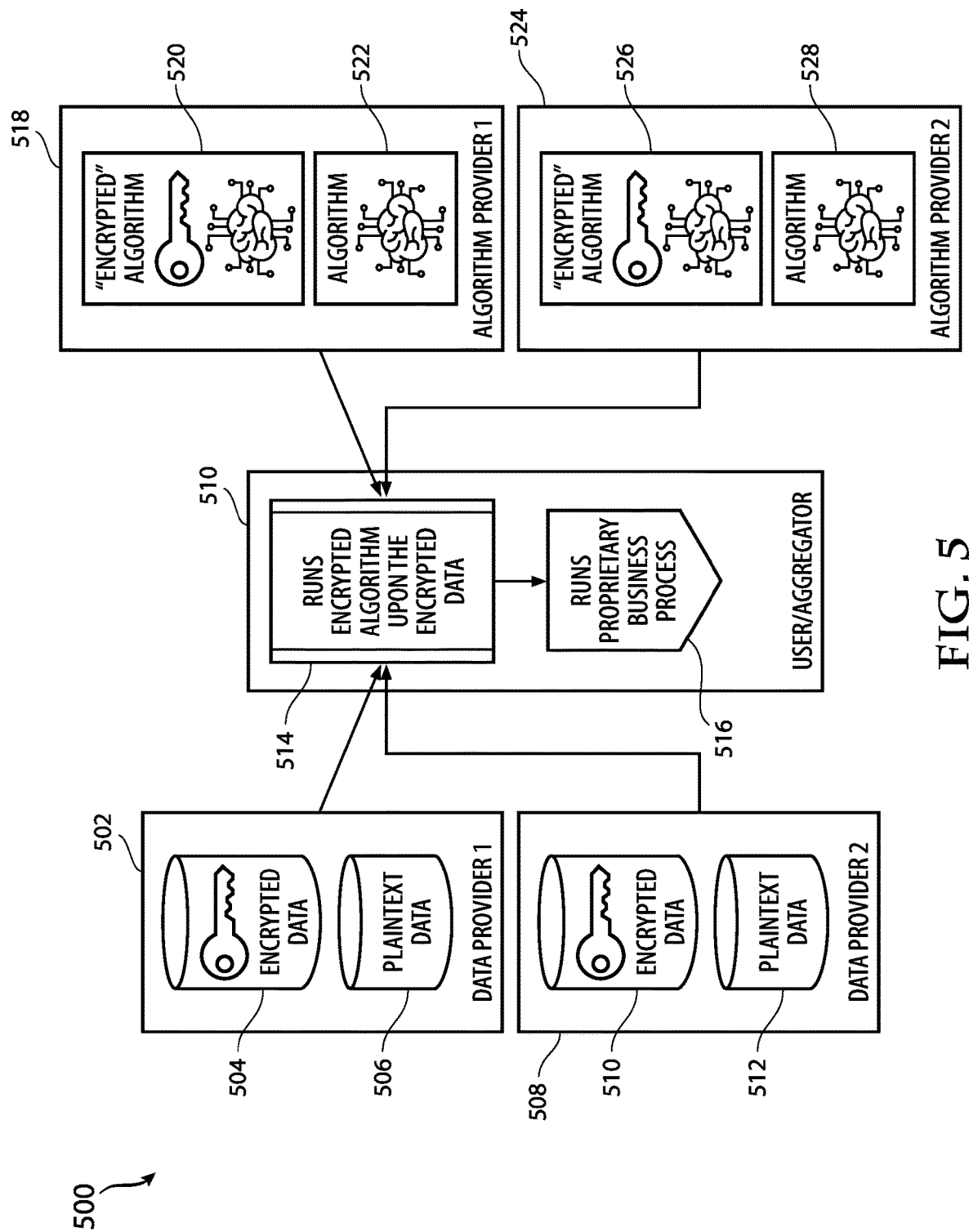
FIG. 5 illustrates multiple data providers and multiple algorithm providers, in accordance with various embodiments.

FIG. 5 shows multiple data providers and multiple algorithm providers, in accordance with various embodiments. The approach discussed herein is not limited to one data provider or one algorithm provider. As an example, the data may be provided by multiple providers and the algorithm may be provided by multiple providers. As an example, FIG. 5 shows an arrangement 500 having a first data provider 502 and a second data provider 508. In addition, FIG. 5 shows a first algorithm provider 518 and a second algorithm provider 524. As shown in FIG. 5, the first data 506 from the first data provider 502 and the second data 512 from the second data provider 504 may be encrypted 504, 510. In addition, the algorithm 522 from the first algorithm provider 518 and the algorithm 528 from the second algorithm provider 524 can be encrypted 520, 526. As a result, multiple data providers and multiple algorithm providers may communicate with one another and work with one another.

A user or aggregator 510 may receive the encrypted data 504 from the first data provider 502 and the second encrypted data 510 from the second data provider 508 and may receive the encrypted algorithm 520 from the first algorithm provider 518 and the second encrypted algorithm 526 from the second algorithm provider 524. The user or aggregator 510 may execute the algorithm on the data and determine a result that may include a proprietary business process 516. As noted above, the user or aggregator 510 may be one of the first data provider 502 or the second data provider 508, the first algorithm provider 518, the second algorithm provider 5524, or may be a different entity. The aggregator 510 may also be a combination or a hybrid of a respective data provider and/or a respective algorithm provider. The aggregator 510 can also in one aspect receive unencrypted data or algorithms and perform the encryption operation within the aggregator 510.

Figure 6:
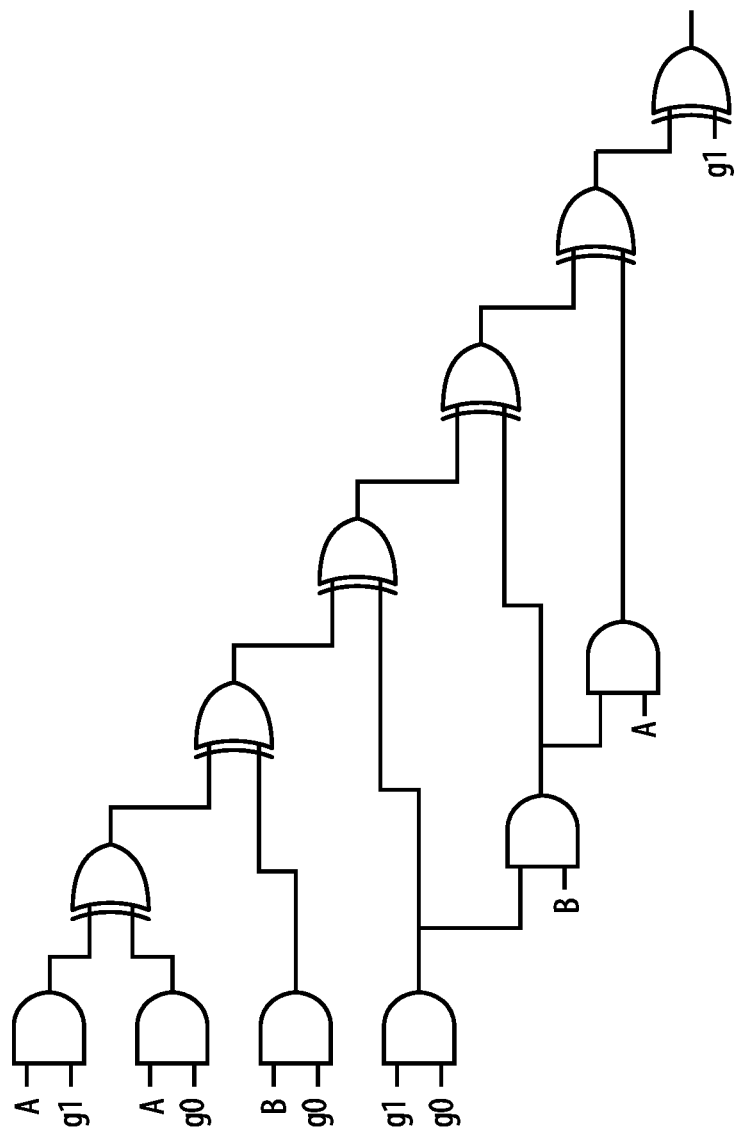
FIG. 6 illustrates an example circuit associated with an algorithm, in accordance with various embodiments.

FIG. 6 illustrates an example circuit 600 associated with an algorithm, in accordance with various embodiments. In some secure multiparty computation (MPC), circuit garbling has been used for secure communication between two participants such as a garbler and an evaluator. The embodiments discussed herein are different from circuit garbling. Multiparty computation (MPC) is able to execute two operations including multiplication (AND) and addition (XOR). As a result, in order to perform complex operations and functions, the operations and functions are to be broken down into AND and XOR operations. The example circuit 600 shown in FIG. 6 includes only XOR, AND, and NOT gates. NOT gates are replaced with XOR gates with a bit of "1" that allows the circuit to represent only AND and XOR gates.

According to embodiments, to hide an algorithm, gates may be replaced with inputs including A and B with a generic circuit as shown in FIG. 6. The inputs g0 and g1 in FIG. 6 may act as control bits such that when g1g0=11, the whole circuit may act as an AND gate for A and B. When g1g0 is equal to 01, the whole circuit may be equivalent to A EXOR B and when g1g0=10, the whole circuit may act as NOT A.

An algorithm may be encoded into a logical or emulated circuit by converting the algorithm into a specific circuit 600 such as one shown in FIG. 6. The circuit may include a correct number and arrangement of gates such that it represents the algorithm. Each of the specific gates in the circuit may be replaced with generic gate slots. Each of the generic gate slots may be populated with a correct bit pattern to cause the gate to function as it should. The gate information may then be copied into a matrix.

In one example, a truth table can be used to descript or resolve the gates shown in FIG. 6 into real gates. For example, the following truth table could be used:

| g1 | g2 | gate |
|----|----|------|
| 1  | 0  | NOT  |
| 0  | 1  | XOR  |
| 0  | 0  | Nothing |
| 1  | 1  | AND  |

FIG. 7 illustrates an example algorithm 308 converted 700 into a hidden circuit 309, in accordance with various embodiments. The hidden circuit can be, for example, the Boolean logic gate set 309 shown in FIG. 3. As an example, the information associated with the gates in circuit shown in FIG. 6 may be hidden and replaced with an anonymized hidden representation 309 as shown in FIG. 7. As an example, the algorithm 308 may be converted into the hidden representation 309. This provides one example method of anonymizing a circuit structure. Other approaches to anonymization can be applicable as well.

Figure 8:
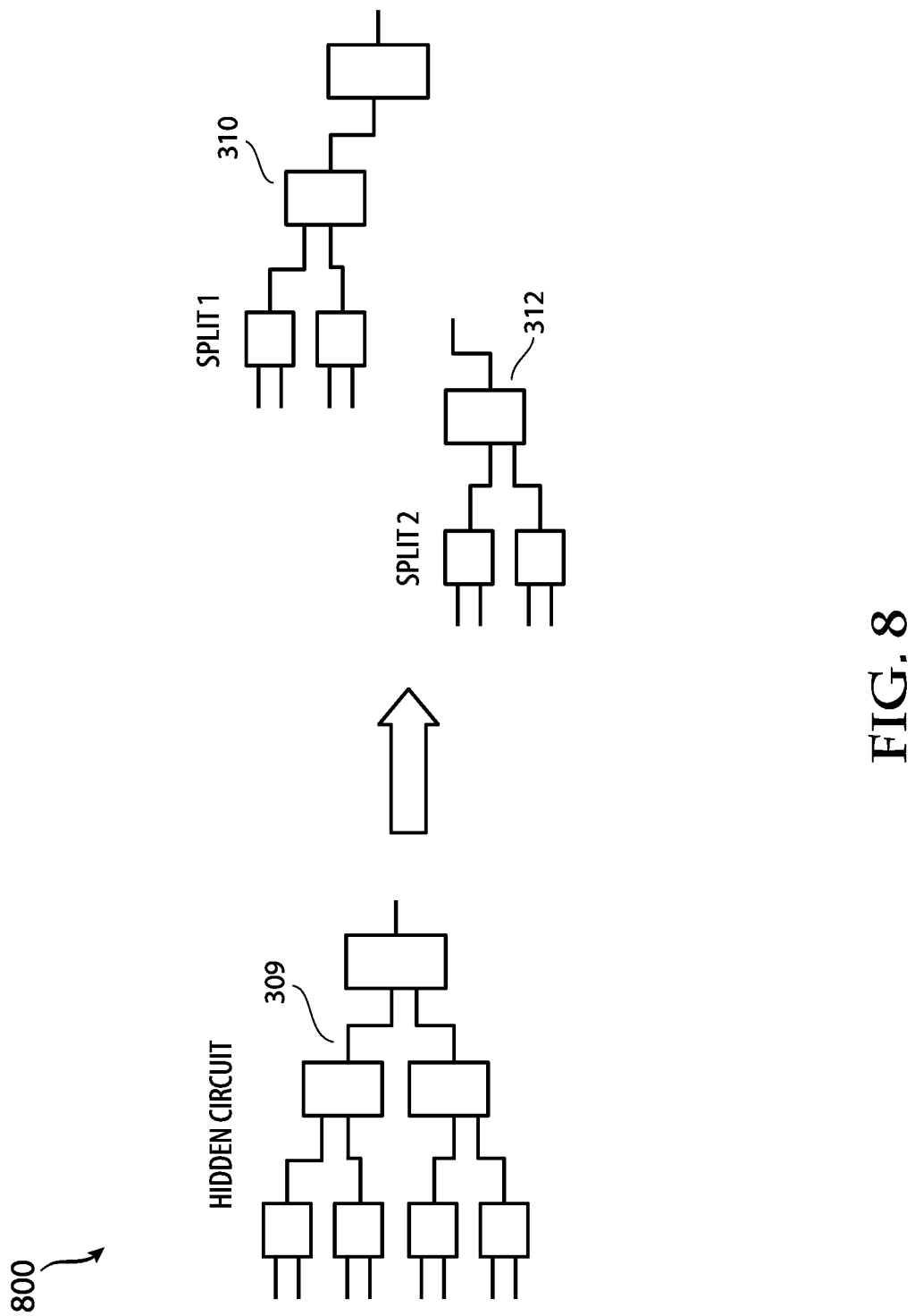
FIG. 8 illustrates the hidden circuit divided into a first split and a second split, in accordance with various embodiments.

FIG. 8 illustrates 800 the hidden circuit 309 divided into a first split or first subset 310 and a second split or second subset 312, in accordance with various embodiments. In other words, the hidden representation 309 may be divided into two splits or subsets. The first subset of the algorithm 310 may be evaluated by a first party, a first computing device or a first virtual compute environment and the second subset of the algorithm 312 may be evaluated by a second party, a second computing device or a second virtual compute environment. Generally speaking, these different splits of the Boolean logic gate set 309 are separate into different compute spots, locations, portions, physical components or virtual component such that their separate processing can be performed in a separated manner.

Figure 9A:
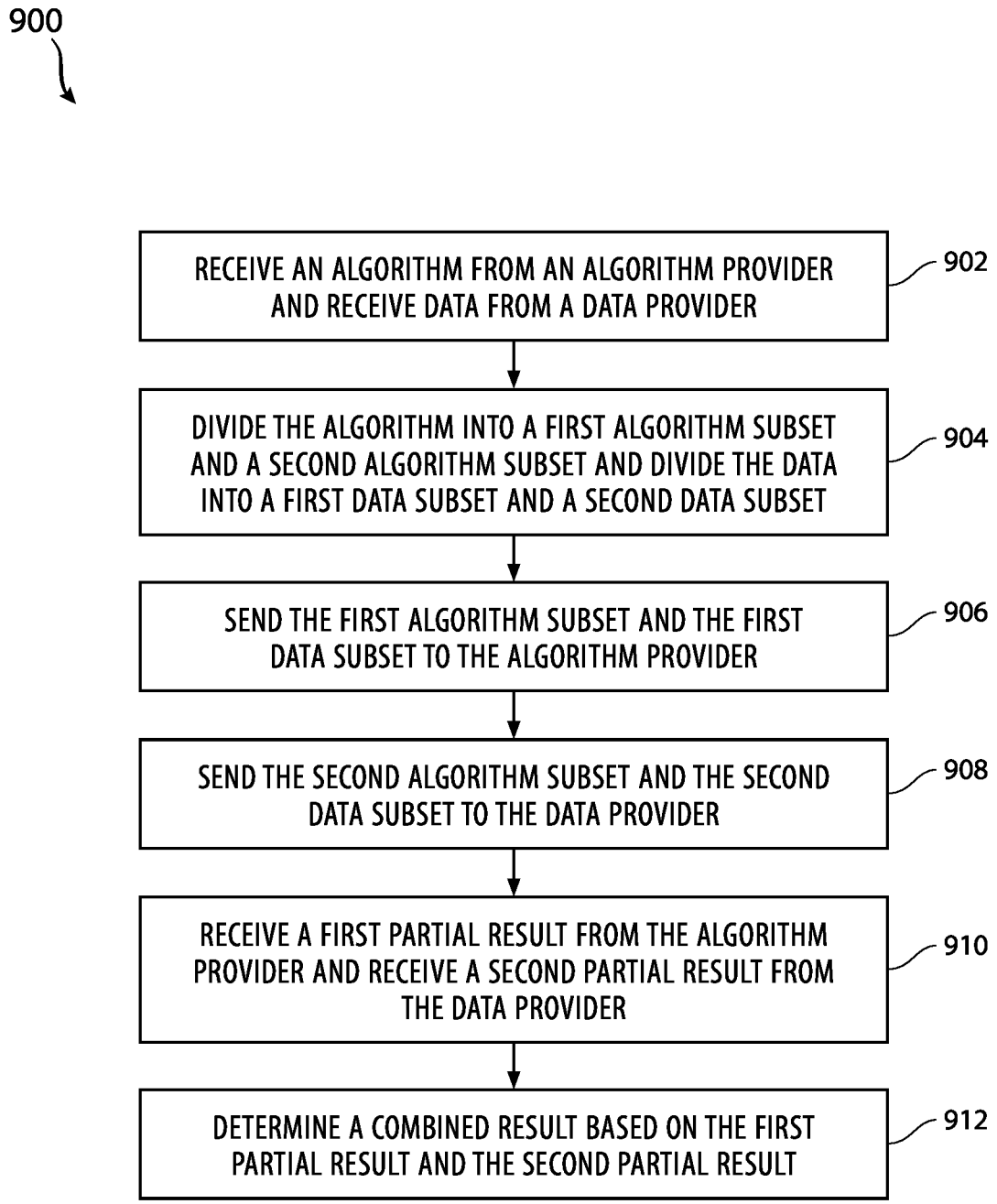
FIG. 9A illustrates an example method for hiding or encrypting an algorithm from a data provider that provides data to the algorithm and hiding or encrypting the data from an algorithm provider that provides the algorithm that operates on the data.

FIG. 9A illustrates an example method 900 for hiding or encrypting an algorithm from a data provider that provides data to the algorithm and hiding or encrypting the data from an algorithm provider that provides the algorithm that operates on the data. The method can include any one or more steps performed in any order. The order disclosed herein is by way of example. According to an example method, at step 902, an algorithm provider may send an algorithm provider to a computing device. In addition, a data provider may send the data to the computing device. The computing device may receive the algorithm and receive the data. The algorithm may be selected from a list of algorithms provided by the algorithm provider and the data may be retrieved by the data provider from a database. In addition, the computing device may encrypt the algorithm and encrypt the data. In one example, the computing device may be a computing device associated with the algorithm provider. In another example, the computing device may be a computing device associated with the data provider. In a further example, the computing device may be a third party computing device and may not be associated with the algorithm provider or the data provider.

At step 904, the computing device may divide the algorithm into a first algorithm subset and a second algorithm subset. The first algorithm subset and the second algorithm subset may not be equally sized subsets. As an example, the first algorithm subset may include one third of the operations associated with the algorithm and the second algorithm subset may include two thirds of the operations associated with the algorithm. Alternatively, the first algorithm subset and the second algorithm subset may be divided into equally sized subsets. As noted above, an alternate step includes anonymizing the algorithm generally or the algorithm subsets.

In addition, the computing device may divide the data into a first data subset and a second data subset. As an example, the first data subset may include one third of the data and the second data subset may include two thirds of the data. Alternatively, the first data subset and the second data subset may be divided into equally sized subsets. In step 906, the computing device may send the first algorithm subset and the first data subset to the algorithm provider. In step 908, the computing device may send the second algorithm subset and the second data subset to the data provider. At step 910, the computing device may receive a first partial result from the algorithm provider. The first partial result may be based on the first algorithm subset and the first data subset. In addition, the computing device may receive a second partial result from the data provider. The second partial result may be based on the second algorithm subset and the second data subset. At step 912, the computing device may determine a combined result based on the first partial result and the second partial result.

In a further example, there can be a Boolean logic gate set associated with the algorithm. The algorithm can be converted into the Boolean logic gate set. This can be performed by the algorithm provider. The computing device may convert the first algorithm subset into a first Boolean logic gate subset from the Boolean logic gate set and may convert the second algorithm subset into a second Boolean logic gate subset from the Boolean logic gate set. The first Boolean logic gate subset and the second Boolean logic gate subset include AND gates and XOR gates. As discussed herein, the algorithm provider may include at least one first computing device and the data provider may include at least one second computing device. In one example, the combined result may be sent to the data provider and the data provider may display a representation of the combined result. In another example, the combined result may be send to the algorithm provider and the algorithm provider may display the representation of the combined result. In another example, the combined result may be sent to another computing device and the other computing device can display the representation of the combined result.

In another aspect, the computing device may keep or send the first algorithm subset and the first data subset and the second algorithm subset and the second data subset to any entity. For example an entity such as aggregator 202 can perform the dividing steps and the processing steps to obtain the first partial result and the second partial result. Generally, the system can process the first algorithm subset with the first data subset and the second algorithm subset with the second data subset separately such that respective algorithms and data are not disclosed to each other.

Figure 9B:
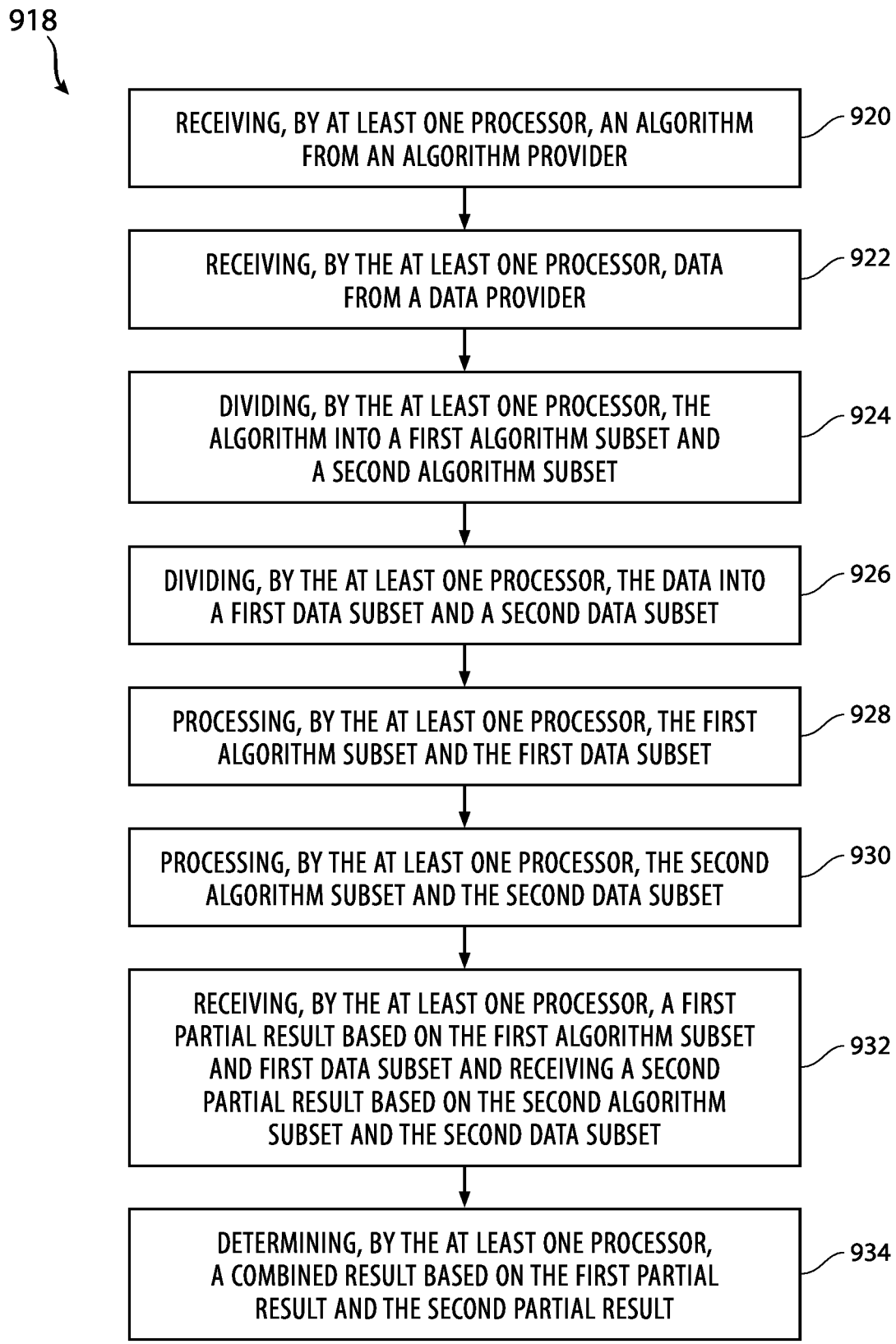
FIG. 9B illustrates another example method.

FIG. 9B illustrates another example method 918. This example method includes, at step 920, receiving, by at least one processor, an algorithm from an algorithm provider, and at step 922, receiving, by the at least one processor, data from a data provider. The method also can include, at step 924, dividing, by the at least one processor, the algorithm into a first algorithm subset and a second algorithm subset, at step 926, dividing, by the at least one processor, the data into a first data subset and a second data subset, at step 928, processing, by the at least one processor, the first algorithm subset and the first data subset and at step 930, processing, by the at least one processor, the second algorithm subset and the second data subset. The method can also include, at step 932, receiving, by the at least one processor, a first partial result based on the first algorithm subset and first data subset and receiving a second partial result based on the second algorithm subset and the second data subset and, at step 934, determining, by the at least one processor, a combined result based on the first partial result and the second partial result.

It is noted that the process of dividing the algorithm and the processing that follows can be accomplished in a number of different ways. For example, the algorithm can be converted into a Boolean logic gate set, or could be represented as a neural network or an algebraic or non-Boolean circuit.

Figure 9C:
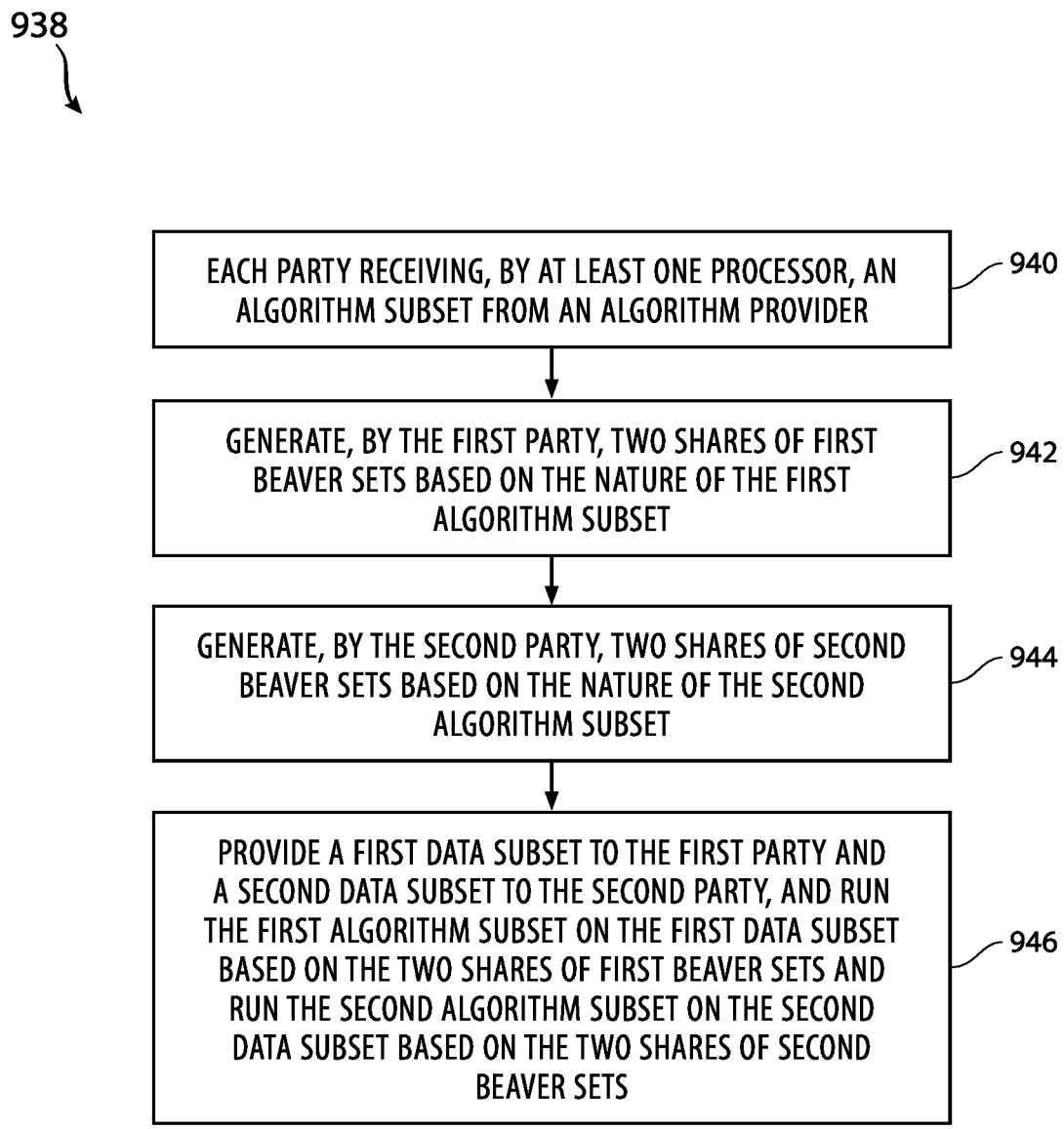
FIG. 9C illustrates yet another example method related to the use of Beaver sets.

In some embodiments, the algorithm can include large and complex algebraic expressions, including algorithms with thousands of operations strung together in a row (common among CNNs, for example). In order to handle such complex algorithms, a Beaver set-based mathematical technique, for example, can be used in order to perform much faster calculation of a large number of arbitrary operations using fewer communication exchanges between two or more parties (e.g., fewer communication exchanges between data providers, algorithm providers, aggregators, etc.). Beaver sets typically used for multiplications can be applied in a new way to the concepts disclosed herein to transform the computations into preprocessing steps. Beaver sets typically do use pre-processing. The additional concepts disclosed herein to the overall process include the ability to do processing differently to support divisional and exponents, and faster multiplications. FIG. 9C, for example, illustrates an example method associated with using Beaver sets to improve the computer computational requirement when implementing the principles disclosed herein.

One issue with multiparty computation can be associated with the number of communications that may be sent via the communication network 110 between the data provider computing device 102 to the algorithm provider computing device 104. The communications may be associated with multiplication and "AND" operation computation complexity. Although MPC is able to support addition and multiplication, multiplication is ordinarily limited. As the numbers being multiplied continue to increase in size, the ability of MPC to calculate begins to approach and hit an upper limit due to the limitations of integer size and computing storage limits. As the limit is encountered, MPC looks to exchange information between computing devices performing the operations. This exchange slows the overall compute performance.

The embodiments discussed herein utilize beaver set multiplication to limit communications between the data provider computing device 102 and the algorithm provider computing device 104 in order to reduce communication and network overhead. The use of beaver set multiplication can apply to any two devices or virtual machines which are used to split data and split algorithms for processing as described herein. Therefore, the issue can arise between any two devices, virtual or physical, that can be used in connection with the principles disclosed herein. In some embodiments, one beaver set triple may be used for each operation (e.g., multiplication operation or AND gates). Beaver set triples may be pre-generated by one party or one computing device when the two parties work together to determine a combined result. As an example, the data provider computing device 102 may pre-generate Beaver sets and the algorithm provider computing device 104 may pre-generate Beaver sets. In another aspect, the aggregator 202 can pre-generate various Beaver sets for one or more of algorithms, data, subsets of algorithms, and subsets of data.

According to embodiments, the beaver set can be utilized at a time of calculation (e.g., after the algorithm has been encrypted and distributed between the data provider computing device 102 and the algorithm provider computing device 104). For example, after the algorithm has been encrypted, split, and distributed to the two parties, the beaver set can be employed when one or both of the parties are ready to perform the calculations. Since calculating encrypted circuits is slow, reducing the amount of information exchange between the two parties by using Beaver sets (which enable more mathematical calculations to be performed by each party before an exchange is made), will increase the speed and efficiency of the overall algorithm and data processing. In other words, the following beaver set based technique can perform complex operations on split data and/or algorithms much faster than previous approaches, since the technique allows more operations to be calculated while separated before exchange between the two parties becomes needed (e.g., exceeds a threshold error).

An example method 938 shown in FIG. 9C can include, at step 940, each party or entity receiving, by at least one processor, an algorithm subset from an algorithm provider. The algorithm subset can be, for example, a first algorithm subset from an algorithm that has been divided into a first algorithm subset and a second algorithm subset. At step 942, a first party can generate two shares of Beaver sets based on a nature of the first algorithm subset or based on other parameters.

For example, the first party (e.g., User A, such as the data provider computing device 102 or the algorithm provider computing device 104), can generate an N by 3 matrix, $Beav_A$. $Beav_A$ can include first and second columns that are randomly generated, and the third column can contain an operation of the algorithm subset. $Beav_A$ can also be generated randomly in part or perhaps be generated based on a non-random process. In this example embodiment, the third column contains the multiplications of the first two columns. The first two columns of the Beaver sets can be randomly generated to mask the actual data (EKG shares), and the third column can be computed depending on the application (multiplication, division, exponential, . . . ). It is preferred that the first two columns be randomly generated to be able to hide the actual data.

User A can then generate two shares of $Beav_A$: $[Beav_A]_A$ and $[Beav_A]_B$. User A can then use a public key and encryption to send $pk_A$, $ENC_{pk_A}([Beav_A]_A)$, and $[Beav_A]_B$ to the second party (e.g., User B, such as the data provider computing device 102 or the algorithm provider computing device 104), where $pk_A$ is public key A, and where $ENC_{pk_A}([Beav_A]_A)$ is encrypted $[Beav_A]_A$ using public key A.

In some embodiments, ENC supports homomorphic encryption for 1 multiplication and 1 addition. Homomorphic encryption is a form of encryption that allows computation on ciphertexts, generating an encrypted result which, when decrypted, matches the result of the operations as if they had been performed on the plaintext. Homomorphic encryption is a form of encryption with an additional evaluation capability for computing over encrypted data without access to the secret key. The result of such a computation remains encrypted.

At step 944, a second party (User B) can generate its two shares of Beaver sets based on the nature of the second algorithm subset, or upon other factors. User B, such as the data provider computing device 102 or the algorithm provider computing device 104, can generate an N by 3 matrix, $Beav_B$ and a random matrix R with the same size of the Beaver sets (N×3). The matrix R may also be generated based on a non-random process. Similarly to $Beav_A$, $Beav_B$ can include first and second columns that are randomly generated, or generated based on some non-random process, and the third column can contain an operation of the algorithm subset. In this example embodiment, the third column contains the multiplications of the two first columns.

User B can then generate two shares of $Beav_B$: $[Beav_B]_A$ and $[Beav_B]_B$. User B can then set $[Beav]_B=[Beav_A]_B \times [Beav_B]_B - R$ and $v = ENC_{pk_A}([Beav_A]_A \times [Beav_B]_B + R)$. User B can then send v and $[Beav_B]_A$ to User A.

The data provider computing device 102 and the algorithm provider computing device 104 of the first and second parties can perform the following: User A can set $[Beav]_A = [Beav_A]_A \times [Beav_B]_A + [Beav_A]_B \times [Beav_B]_A + DEC_{sk_A}(v)$. User B then has a share of: $[Beav]_B = [Beav_A]_B \times [Beav_B]_B - R$; and User A has a share of $[Beav_A]_A \times [Beav_B]_A + [Beav_A]_B \times [Beav_B]_A + DEC_{Sk_A}(v)$. In some embodiments, a beaver set can also be used for division operations between the data provider computing device 102 and the algorithm provider computing device 104. The two parties may work together to perform a division using, for example, only six communications. As an example, the two parties may perform a division operation of x/y using e, d, and an e/d beaver triple. For example, e can be the first column of the beaver set, and d can be the second column of the beaver set. The third column can be e/d (e divided by d). The two first columns are generated randomly and the third column can be the division of the first column by the second column.

The first party (User A) and/or second party (User B) can generate an N by 3 matrix beaver triple set where the third column contains the division of the first column by the second column. User A and User B can then cooperatively compute x'=x×d and y'=y×e (e.g., both parties will know the x' and y' values). User A can then compute $[xd]_A$ and User B can compute $[xd]_B$. Both User A and User B can then jointly reconstruct xd.

In one aspect, the data provider computing device 102 and the algorithm provider computing device 104 can perform the following: User A's share of $$\text{division} = \frac{x'}{y'}\left[\frac{e}{d}\right]_A$$

and User B's share of $$\text{division} = \frac{x'}{y'}\left[\frac{e}{d}\right]_B.$$

At step 946, the data provider can provide the split data sets to the two parties and, using the corresponding Beaver sets, run the split algorithms on the split data sets. In some embodiments, the data can be split into a random share of the full dataset so as to further hide sensitive information (e.g., patterns that expose demographic information, sex, age, race, or other biometrics that expose patient identity, etc.). The method can include in this regard running the first algorithm subset on the first split data subset based on the two shares of the first mathematical set to yield a first output subset and running the second algorithm subset on the second split data subset based on the two shares of the second mathematical set to yield a second output subset. The method can then include combining the first output subset and the second output subset.

In some embodiments, calculation speed can be further increased through one or more memoization techniques, which is an optimization technique that can be used to speed up computations by storing the results of expensive function calls and returning the cached result when the same inputs occur again. A memoized function, for example, can cache the results corresponding to some set of specific inputs. Subsequent calls with remembered inputs (from the cache) can return the remembered result rather than recalculating it, thus eliminating the primary cost of a call with given parameters from all but the first call made to the function with those parameters. Thus, memorization can populate its cache of results transparently on the fly, as needed, rather than in advance.

In another example, assume in a chess game one player wants to compute the number of available opening moves. After first move, the player computes possible moves as a result of that first move, etc. Instead of recalculating every possible move as a result of that move, the player keeps a list of all possible moves that can be done according to a particular configuration so that the chess game becomes faster. The player keeps a memo instead of recalculating the possible moves every time. This example model applies to Beaver sets related to memorizing operations that allow the system to accumulate as little error as possible. Each party generates Beaver sets on their end. In the algorithm example, the system generates the beaver set and runs the algorithms on the data.

As another example, memorization techniques can be applied for each transaction between the two parties. In one example, a number of EKGs (say, 50 EKGs) can be designated for batch processing. The same Beaver sets may be used for all 50 EKGs rather than recalculating for each EKG within the set. However, in order to frustrate pattern recognition, the Beaver sets can be regenerated at the next transaction (e.g., the next batch of EKGs) in a distributed fashion.

Another aspect of this disclosure relates to providing additional efficiency when processing the data subsets by the algorithm subsets. The algorithm is split into two portions and then distributed between the two parties in a transaction. Control bits will be used between the two different spots or locations performing the calculations on the different data subsets and algorithm subsets that ultimately decipher what the actual final evaluation is of the circuits.

One approach disclosed herein uses Beaver sets to allow for multiplications with fewer communication hops. The beaver set (or similar mathematical structure) is introduced above and can be employed at a time of calculation (e.g., after the algorithm has been encrypted and/or distributed) to reduce the amount of exchanges between devices or the different locations where computations are occurring. The approach allows computations to be performed faster before an exchange is needed. The approach is next described in the context of filters in various layers of a neural network.

Figure 9D:
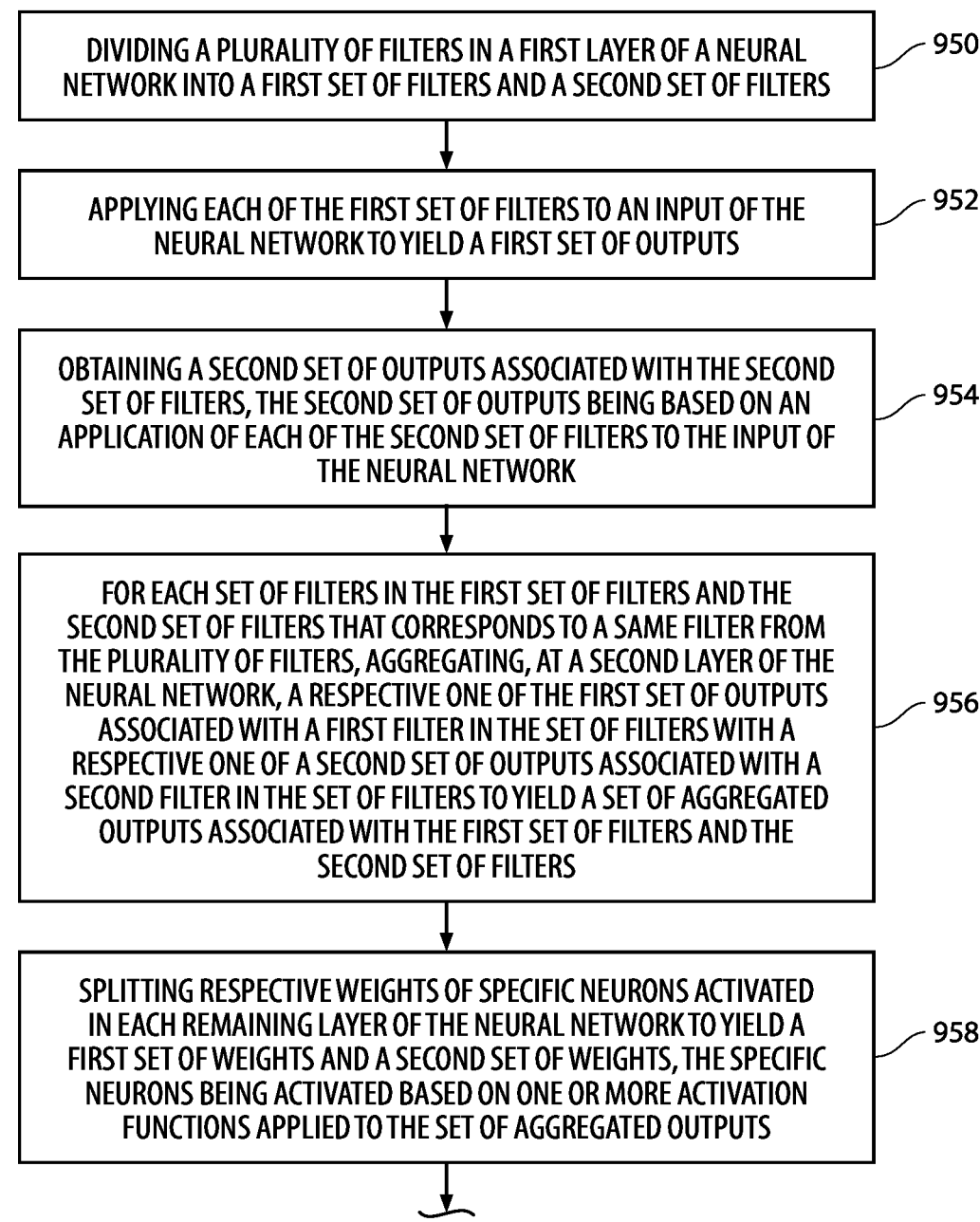
FIG. 9D illustrates another example method.
Figure 9D:
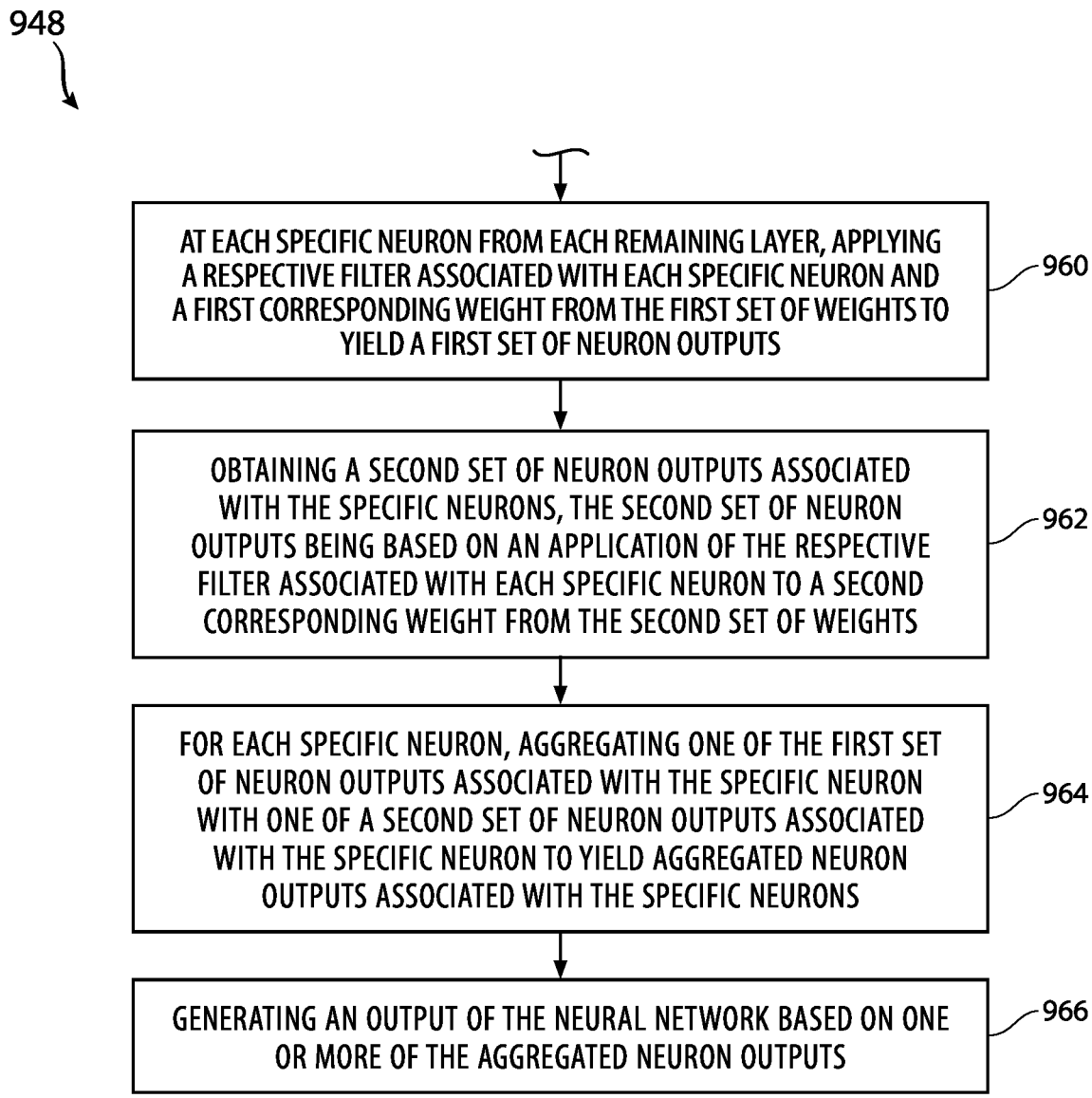

FIG. 9D illustrates an example method 948. The method includes, at step 950, dividing, via one or more computing devices, a plurality of filters in a first layer of a neural network into a first set of filters and a second set of filters, at step 952, applying, via the one or more computing devices, each of the first set of filters to an input of the neural network to yield a first set of outputs, and at step 954, obtaining a second set of outputs associated with the second set of filters, the second set of outputs being based on an application of each of the second set of filters to the input of the neural network. At step 956, for each set of filters in the first set of filters and the second set of filters that corresponds to a same filter from the plurality of filters, the method includes aggregating, via the one or more computing devices and at a second layer of the neural network, a respective one of the first set of outputs associated with a first filter in the set of filters with a respective one of a second set of outputs associated with a second filter in the set of filters to yield a set of aggregated outputs associated with the first set of filters and the second set of filters.

The method further includes, at step 958, splitting, via the one or more computing devices, respective weights of specific neurons activated in each remaining layer of the neural network to yield a first set of weights and a second set of weights, the specific neurons being activated based on one or more activation functions applied to the set of aggregated outputs. At each specific neuron from each remaining layer, the method includes, at step 960, applying, via the one or more computing devices, a respective filter associated with each specific neuron and a first corresponding weight from the first set of weights to yield a first set of neuron outputs, at step 962, obtaining a second set of neuron outputs associated with the specific neurons, the second set of neuron outputs being based on an application of the respective filter associated with each specific neuron to a second corresponding weight from the second set of weights, at step 964, for each specific neuron, aggregating one of the first set of neuron outputs associated with the specific neuron with one of a second set of neuron outputs associated with the specific neuron to yield aggregated neuron outputs associated with the specific neurons and, at step 966, generating an output of the neural network based on one or more of the aggregated neuron outputs. The above method can include any one or more of the identified steps in any order.

Figure 10:
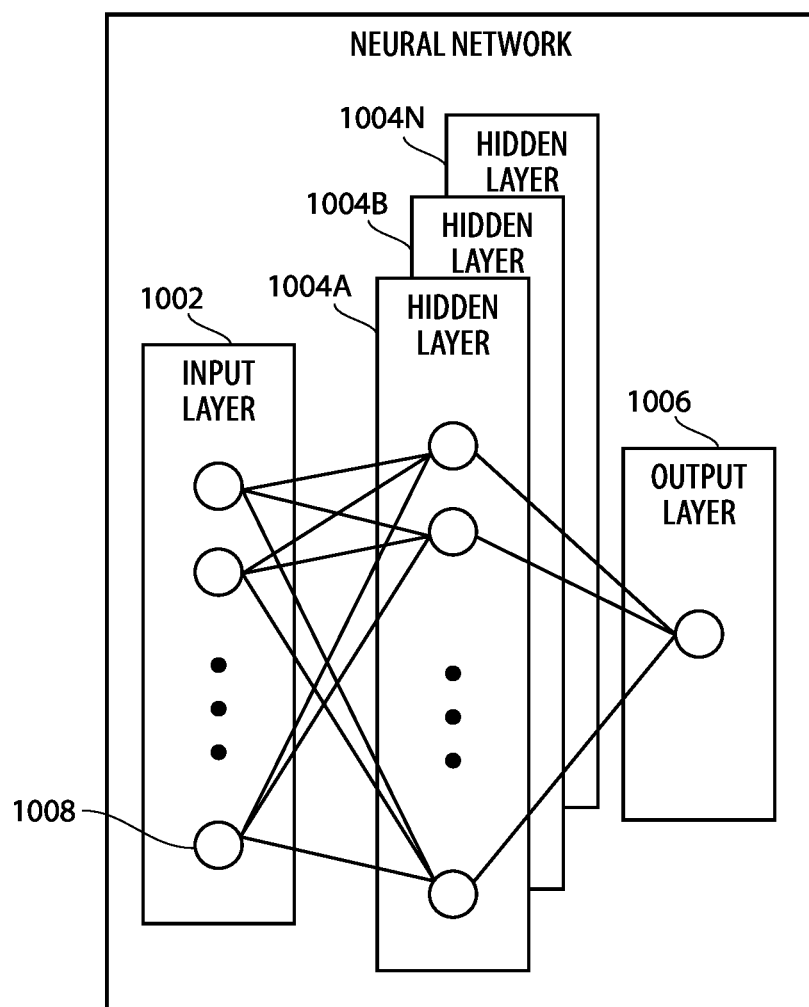
FIG. 10 illustrates an example neural network.

FIG. 10 illustrates an example neural network 1000 which can represent an algorithm processed as described herein. Neural networks are often used to analyze or evaluate visual imagery or can be used for image recognition, video recognition, speech or natural language processing, and so forth. A convolutional neural network (CNNs) will have an input layer 1002 that receives the input and convolves the input and passes it on to a next hidden layer 104A or a group of hidden layers 1004A, 1004B, 1004C. Each layer receives the input from the previous layer which can be a restricted subarea of the previous layer. The hidden layers of a CNN 1000 can include a series of convolutional layers that convolve with a multiplication or other dot product. An activation function, or a Re-LU layer, is subsequently followed by additional convolutions such as pooling layers, fully connected layers and normalization layers, referred to as hidden layers 1004A, 1004B, 1004C. The term "hidden" is used due to the inputs and outputs being masked by the activation function and final convolution. The final convolution can involves backpropagation to more accurately weight the end product at the output layer 1006. Mathematically, the "convolution" can include applying a sliding dot product or cross-correlation.

Each neuron in the neural network computes an output value. It applies a specific function to the input values from the previous layer. The functions that are applied can be determined by a vector of weights and a bias. The learning process involves making adjustments to the biases and weights, on an iterative basis. In one aspect, the vector of weights and bias are called filters and represent particular features in the input. For example, the features could include color, or shape of an image. In CNNs, some neurons can share the same filter which can reduce the memory requirements since a single filter can be used across a group or all receptive fields sharing the filter. In other aspect, each receptive field may have its own bias and vector weighting. The output layer 1006 provides the result of the neural network process.

While CNNs are primarily mentioned in this disclosure, the disclosure is not limited to any particular type of neural network or machine learning technique.

Figure 11:
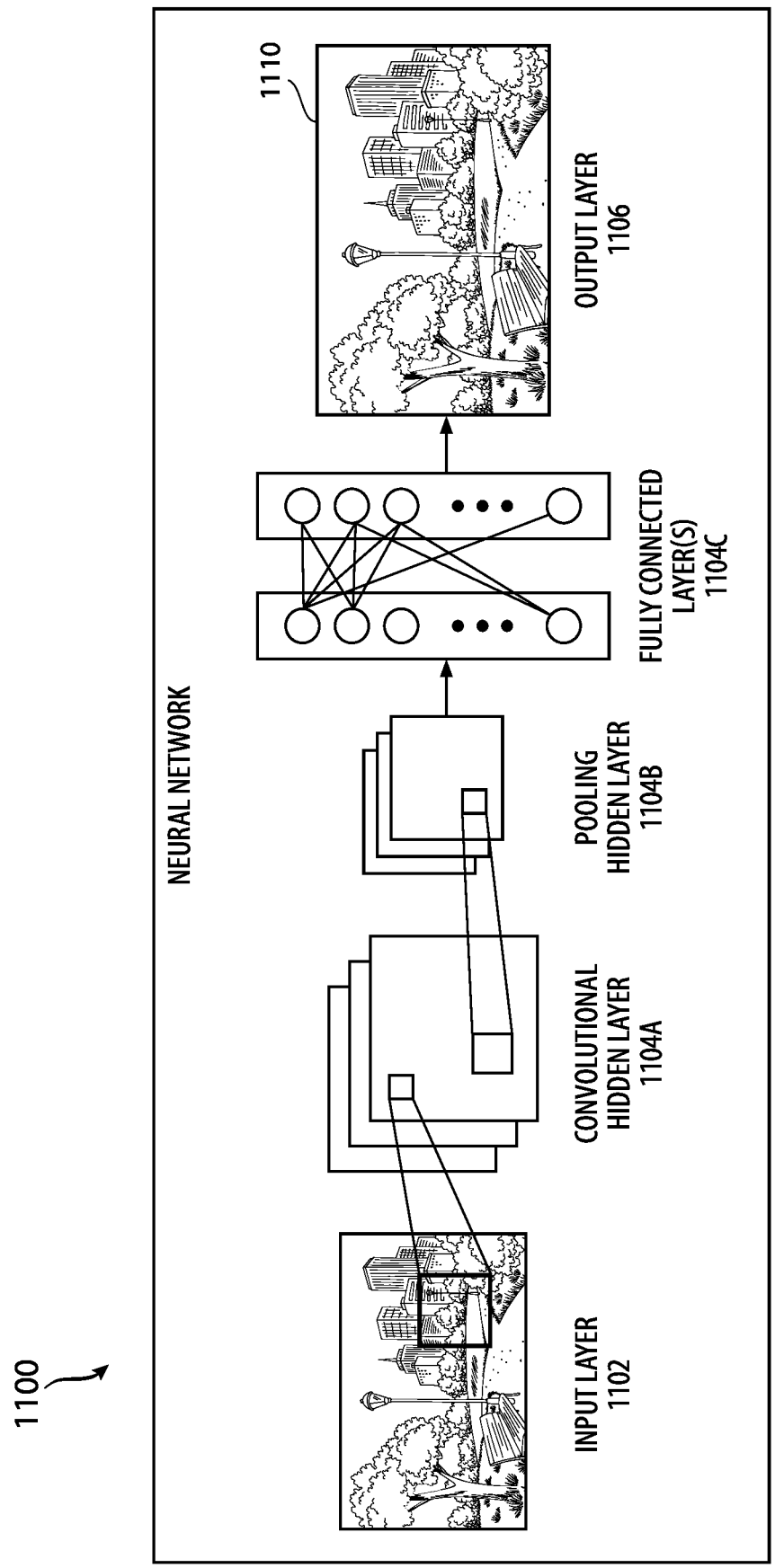
FIG. 11 illustrates an another example of the various layers used on an neural network.

FIG. 11 illustrates an example application of a CNN 1100. The input layer 1102 will begin to process an image or a certain portion of an image as shown. The image will be processed as described above by one or more convolutional hidden layers 1104A and then communicated to a pooling hidden layer 1104B. The pooling layer can reduce the dimensions of the data by combining the outputs of neuron clusters at one layer into a single neuron in the next layer. Global pooling can operate on all the neurons of the convolutional layer. In addition, pooling may compute a maximum or an average. Maximum pooling uses the maximum value from each of a cluster of neurons at the prior layer. Average pooling uses the average value from each of a cluster of neurons at the prior layer. The pooling layer 1104A can perform any of these operations.

The fully connected layers 1104C connect every neuron in one layer to every neuron in another layer. This layer is similar to the traditional multi-layer perceptron neural network (MLP). The flattened matrix goes through a fully connected layer to classify the images. A flatten layer is a rearrangement of the data which can involves rearranging shares. The output image 1110 can then be classified. For example, the output may identify the image as a park, or a city, and so forth.

A convolutional neural network processes data through many different layers. The system is first applying a convolution operation in one layer of the CNN. 1100. Then, the next layer can be a max-pool where the system takes the maximum value after having applied the convolution operations in each one of the matrices. In the first layer of the CNN, the system is performing the convolution operation but doing split versions of the CNN. For image data, for example, the system still runs a same window, pixel by pixel by pixel, over an entire image. But, the filter (weights, biases, or in other words, numbers), is transformed into two splits, so the 1's of the filter become 0.5's, the 2's become 1 and 1, and the 3's become 2 and 1. Images can be split in this way as well.

The system then runs the operation on again on split versions of this image. In one example, the system can randomly split the pixel values for each of the color channels. In a color context, the values may be any value from 0 to 256. Similarly, the system can perform the convolution operation where the other side is aware that some operation is happening, but does not know specifically what the filter is. Then, aggregation can occur at the max-pool layers, which are the next layers. Then, based on how the convolutions and max-pool operations happen, specific points of the neural network can be activated. Those points are typically called a neuron in the neural network, and the activation function can be a Re-LU function, a sigmoid function or something other function.

In an example application of an Re-LU function, the Re-LU function is essentially up until a certain 0.0 [point 0], and after that, the neuron is a 1. The neuron is either on or off. Depending on the input values of an image, the Re-LU function will turn on specific points in the neural network, essentially separate neurons on and off, and those different neurons are weighted differently. According to this disclosure, the system splits the weights here such that the entities participating in the exchange do not know what they are doing per se.

The system proceeds to process data layer by layer by layer applying these kinds of operations. The last layer can be a softmax layer. The approach outputs the same softmax layer even though the system performs complicated math to hide it. The softmax layer is what reveals the output of the neural network. One technical benefit of this process is that it obtains results in fewer network hops.

Further with reference to FIG. 11 and the various layers of a CNN, this disclosure will next step through an example evaluation of the CNN 1100. Assume in one example input A:n*m*d. One can hide the convolutional layer 1104A by hiding the weights corresponding to each kernel. So each kernel moves along each layer of the input with (m*n) size and depth d. In this example, there is multiplication and addition within and between the layers. To minimize the number of communications, this disclosure provides for computing all the multiplications first and then computing the additions. For each kernel, the system will need on communication.

A flatten layer can be used to rearrange the shares. A maximum pooling layer 1104B can be used. There are two example approach for maximum pooling. First, if $input_A > input_B$, the output of the function $f = \max(input_A, input_B)$ is A. In such a case, the system can find the maximum of two inputs using SMPC with two communications. In another example, if $input_A > input_B$, then the output of the function $f = \max(input_A, input_B)$ can be $input_A$. In this case, the system needs to create the comparison circuit and use $((1-(A>B))*B+(A>B)*A$ to output the greater value. The advantages of this method over the first method is that no party learns anything about the location of the maximum value on the other hand it is expense in terms of computations and time.

The Sigmoid function is mentioned above. The Sigmoid function is $e^x/(1+e^x)$. To evaluate this function on input X, a new idea is applied as follows. The process is divided into two parts. First, the system will use the Beaver set idea disclosed herein to compute $e^x$. There is a preprocessing part including the following:

User A and User B generate two random Beaver sets such that the first column is random and the second column is random and the second column is $1/e^rA$ and $1/e^rB$ where $r_A$ and $r_B$ are values in the first column.

User A sends $enc(r_A)$ and $enc_A(1/e^rA)$ to User B.

User B generates to random column $[a]_B = m_1$ and $[b]_B = m_2$ and which are User B's share from the final beaver set.

User B computes $enc_A(m_1 - (r_A + r_B))$ and $enc_A(m_2 - (1/e^rA \times 1/e^rB))$ and sends them to user A.

User A's shares are $[a]_A = (r_A + r_B) - m_1$ and $[b]_A = (1/e^rA \times 1/e^rB) - m_2$.

Next is shown an approach to computing $e^x$.

User A opens $[x]_A + [a]_A$, where a is the first column and the nth row (n is the counter for each a the system consumes over one row.

User B also opens $[x]_B + [a]_B$, so both parties learn x+a.

User A's share of $e^x$ is $(e^{(x+a)}) \times [b]_A$ and User B's share of $e^x$ is $(e^{(x+a)}) \times [b]_B$).

Nest is shown an example of a divisional algorithm for x/y:

User A and User B select two random numbers $[r]_A$ and $[r]_B$ and jointly compute yr and 1/yr.

User A and User B jointly compute $[xr]_A$ and $[xr]_B$.

User A's share of division is $[xr]_A/yr$ and User B's share is $[xr]_B/yr$.

Since the sigmoid function consists of division and exponential, the system can compute it as explained above. This disclosure uses the exponential invention to then compute ReLU activations for a neural network. This is accomplished by closely approximately ReLU via a sigmoidal-like function. The Relu function as a sigmoidal-like function and can also be computed as a derivative of the ideas set forth above. There are several possible approaches for computing Relu. First, both parties learn that x is greater or small than zero. If it is greater than zero, then the parties don't change the shares. If it is smaller than zero, their shares are replaced by 0. This approach has some security issues. In another approach, no party learns anything but it is slower as it operates at the gate level.

In the fully connected layer 1104C, each layer acts as a matrix multiplication to the input and SMPC supports addition and multiplication. To hide this layer, the system adds some dummy nodes with all entering weights equal to zero so neither weight nor the structure of the network are learned.

A basic idea of the convolutional neural net is that the system does not need the output of the convolutional net until the next layer. The system can postpone the multiplication communications. In other words, for each filter, $f_i$ and input I, the system can move the filter along and compute the multiplication partially. Or, the system can perform whatever needs to be done before the communication occurs to the next layer.

Figure 12:
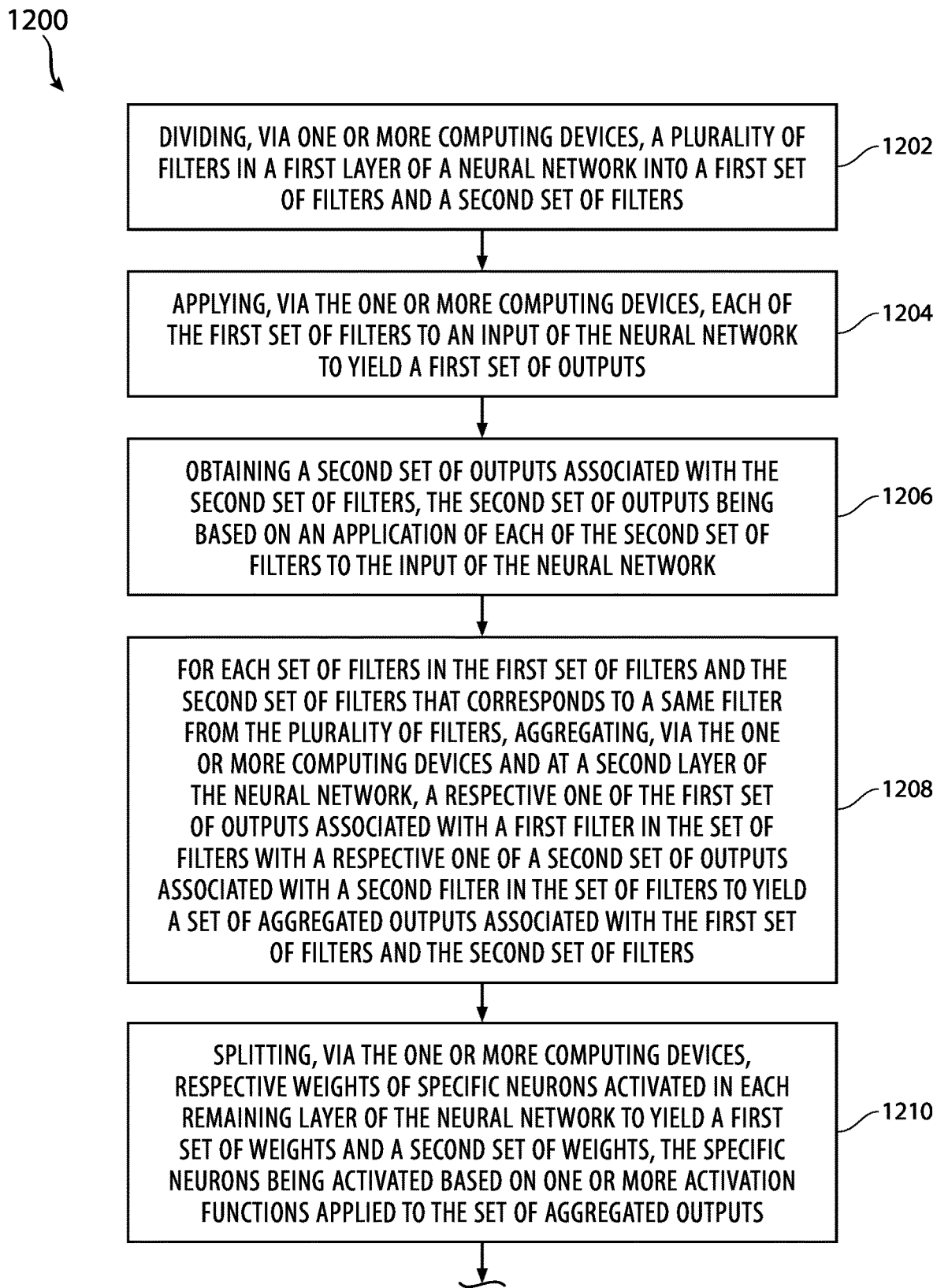
FIG. 12 illustrates an example method associated with using filters in a neural network.
Figure 12:
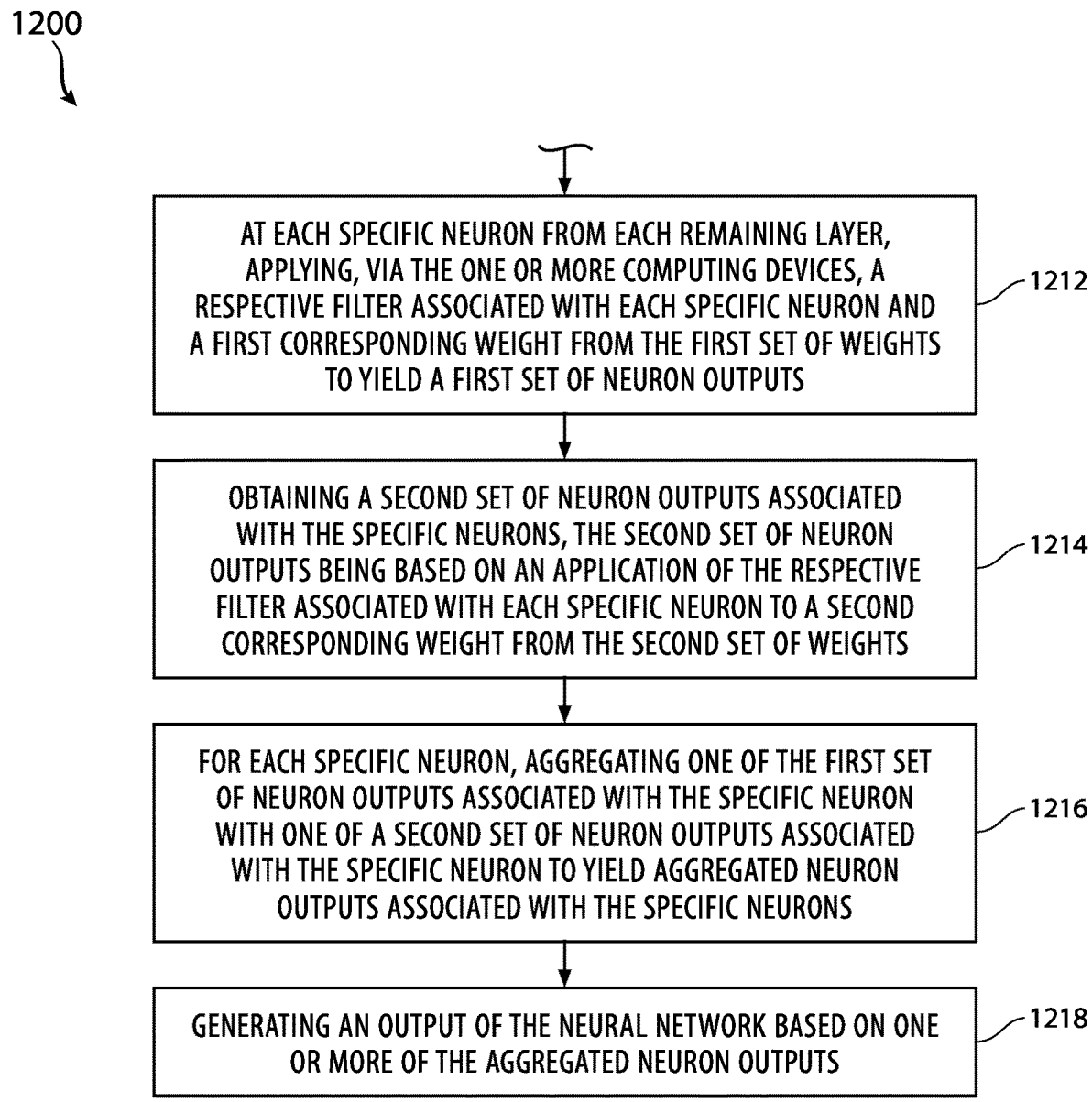
Figure 13:
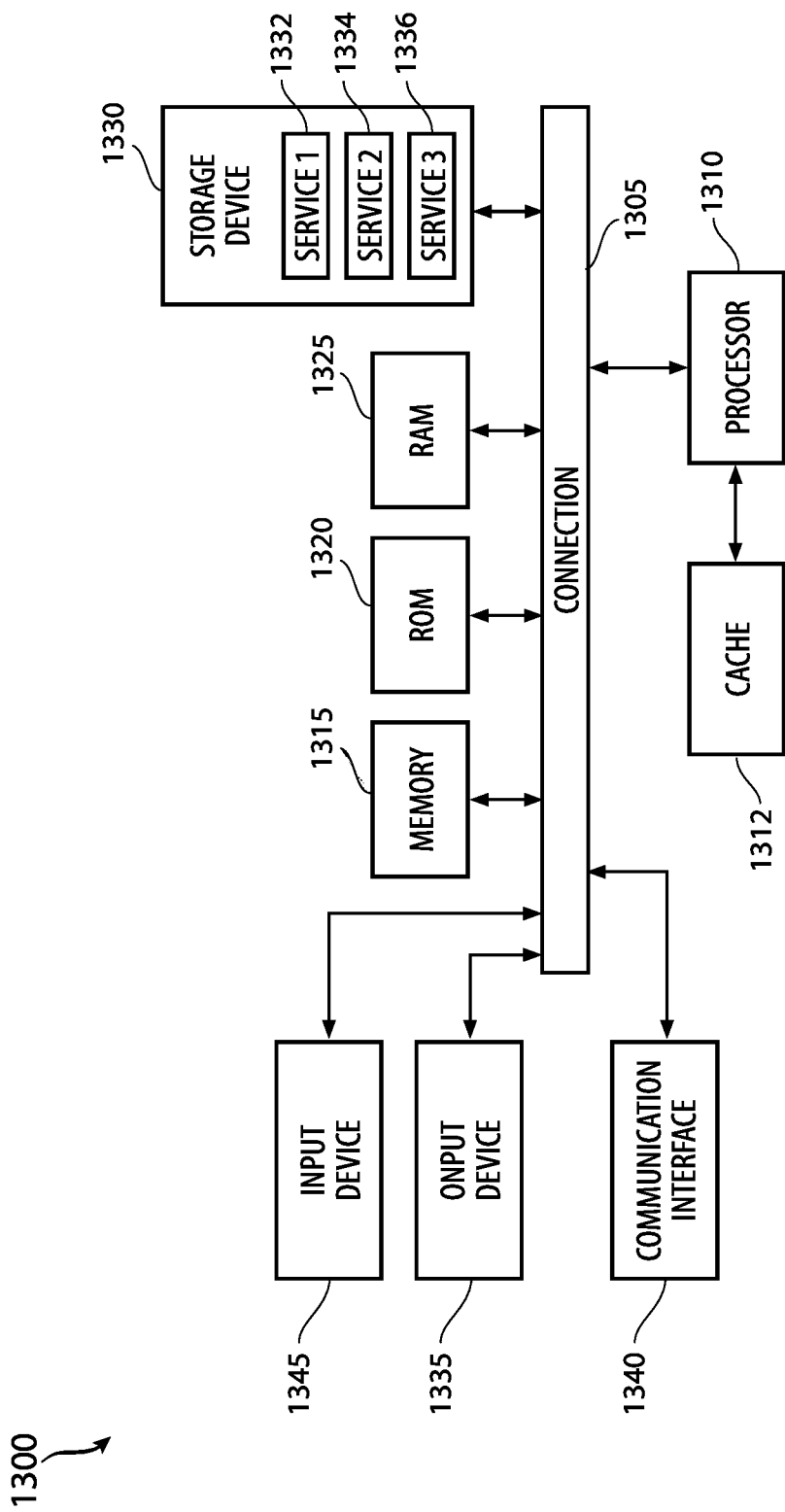
FIG. 13 illustrates an example computing device in accordance with various embodiments.

FIG. 12 illustrates a method 1200 of processing a neural network according to the principles disclosed herein. At step 1202, the method includes dividing a plurality of filters in a first layer of a neural network into a first set of filters and a second set of filters. At step 1204, the method includes applying each of the first set of filters to an input of the neural network to yield a first set of outputs, and at step 1206, obtaining a second set of outputs associated with the second set of filters, the second set of outputs being based on an application of each of the second set of filters to the input of the neural network. At step 1208, the method includes, for each set of filters in the first set of filters and the second set of filters that corresponds to a same filter from the plurality of filters, aggregating, at a second layer of the neural network, a respective one of the first set of outputs associated with a first filter in the set of filters with a respective one of a second set of outputs associated with a second filter in the set of filters to yield a set of aggregated outputs associated with the first set of filters and the second set of filters. At step 1210, the method includes splitting respective weights of specific neurons activated in each remaining layer of the neural network to yield the first set of weights and the second set of weights, the specific neurons being activated based on one or more activation functions applied to the set of aggregated outputs. At step 1212, the method includes, at each specific neuron from each remaining layer, applying a respective filter associated with each specific neuron and a first corresponding weight from the first set of weights to yield a first set of neuron outputs. At step 1214, the method includes obtaining a second set of neuron outputs associated with the specific neurons, the second set of neuron outputs being based on an application of the respective filter associated with each specific neuron to a second corresponding weight from the second set of weights. The method includes, at step 1216, for each specific neuron, aggregating one of the first set of neuron outputs associated with the specific neuron with one of a second set of neuron outputs associated with the specific neuron to yield aggregated neuron outputs associated with the specific neurons and, at step 1218, generating an output of the neural network based on one or more of the aggregated neuron outputs.

In one aspect, the plurality of filters can include a plurality of filter values, wherein the first set of filters includes a first set of values and the second set of filters includes a second set of values. The input of the neural network, as noted above, can include image data or any other type of data. The first set of outputs can further include a first respective output from each filter in the first set of filters.

In one aspect, the first layer of the neural network can include a convolutional layer and the neural network can include a convolutional neural network. As noted above, this disclosure is not limited to specific convolutional neural networks, however. At least one remaining layer in the neural network can include at least one of a pooling layer, a normalization layer, a fully-connected layer, and an output layer. A normalization layer can be one of the hidden layers. Training state-of-the-art, deep neural networks can be computationally expensive. One way to reduce the training time is to normalize the activities of the neurons in the neural network. Batch normalization uses a distribution of the summed input to a neuron over a mini-batch of training cases to compute a mean and variance which are then used to normalize the summed input to that neuron on each training case. This significantly reduces the training time in feed-forward neural networks. In one aspect, using a normalization layer can stabilize the hidden state dynamics.

In another aspect, the one or more activation functions can include at least one of a rectified linear unit function, a sigmoid function, a hyperbolic tangent function, and a softmax function.

The input of the neural network can include an image and the output of the neural network can include at least one of an indication of one or more features detected in the image and/or a classification of one or more features in the image.

In another aspect, dividing the plurality of filters into the first set of filters and the second set of filters can include randomly splitting each filter in the plurality of filters into a set of first and second values that, when combined, are equal to a value of filter.

The method can further include sending the second set of filters to a remote computing device and obtaining the second set of outputs associated with the second set of filters from the remote computing device. In another aspect, the method can include sending, the second set of weights to a remote computing device and obtaining the second set of neuron outputs associated with the specific neurons from the remote computing device.

FIG. 13 illustrates an example computing system architecture of a system 1300 which can be used to process data operations and requests, store data content and/or metadata, and perform other computing operations. In this example, the components of the system 1300 are in electrical communication with each other using a connection 1305, such as a bus. The system 1300 includes a processing unit (CPU or processor) 1310 and a connection 1305 that couples various system components including a memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to cache 1312 for quick access by the processor 1310. In this way, the cache can provide a performance boost that avoids processor 1310 delays while waiting for data. These and other modules can control or be configured to control the processor 1310 to perform various actions. Other memory 1315 may be available for use as well. The memory 1315 can include multiple different types of memory with different performance characteristics. The processor 1310 can include any general purpose processor and a hardware or software service, such as service 1 1332, service 2 1334, and service 3 1336 stored in storage device 1330, configured to control the processor 1310 as well as a special-purpose processor where software instructions are incorporated into the actual processor design. The processor 1310 may be a completely self-contained computing system, containing multiple cores or processors, a bus, memory controller, cache, etc. A multi-core processor may be symmetric or asymmetric.

To enable user interaction with the computing system 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing system 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include services 1332, 1334, 1336 for controlling the processor 1310. Other hardware or software modules are contemplated. The storage device 1330 can be connected to the connection 1305. In one aspect, a hardware module that performs a particular function can include the software component stored in a computer-readable medium in connection with the necessary hardware components, such as the processor 1310, connection 1305, output device 1335, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A system comprising:
   at least one processor; and
   a non-transitory computer-readable storage device storing instructions which, when executed by the at least one processor, cause the at least one processor to:
   convert a first algorithm subset of a n algorithm into a first Boolean logic gate subset of a Boolean logic gate set and a second algorithm subset of the algorithm into a second Boolean logic gate subset of the Boolean logic gate set;
   represent data as a first additive share and a second additive share, wherein the first additive share plus the second additive share equals the data such that sharing the first additive share or the second additive share does not reveal the data or any subset of the data;
   process, by a first entity and using Beaver triplet, the first Boolean logic gate subset with the first additive share to generate a first partial result;
   process, by a second entity and using Beaver triplet, the second Boolean logic gate subset with the second additive share to generate a second partial result, wherein the first entity and the second entity respectively exchange the first partial result and the second partial result as part of a secure multi-party computation process;
   determine a combined result based on the first partial result and the second partial result; and
   send the combined result to an entity comprising one or more of a data provider that provides the data, an algorithm provider that provides the algorithm, and a third party that initiated a process between the data provider and the algorithm provider to display, for the entity, a representation of the combined result.

2. The system of claim 1, wherein the first Boolean logic gate subset and the second Boolean logic gate subset comprise AND gates and XOR gates.

3. The system of claim 1, wherein the algorithm provider provides the algorithm and wherein the algorithm provider comprises at least one first computing device and a data provider provides the data and wherein the data provider comprises at least one second computing device.

4. The system of claim 1, wherein the algorithm is selected from a list of algorithms provided by the algorithm provider.

5. The system of claim 1, wherein the algorithm is represented by one of a Boolean logic set, a neural network or an algebraic circuit.

6. The system of claim 1, wherein the non-transitory computer-readable storage device stores additional instructions which, when executed by the at least one processor, cause the at least one processor to:
   encrypt the algorithm and encrypt the data.

7. A method comprising:
   converting a first algorithm subset of an algorithm into a first Boolean logic gate subset of a Boolean logic gate set and a second algorithm subset of the algorithm into a second Boolean logic gate subset of the Boolean logic gate set;
   representing data as a first additive share and a second additive share, wherein the first additive share plus the second additive share equals the data such that sharing the first additive share or the second additive share does not reveal the data or any subset of the data;
   processing, by a first entity and using Beaver triplet, the first Boolean logic gate subset with the first additive share to generate a first partial result;
   processing, by a second entity and using Beaver triplet, the second Boolean logic gate subset with the second additive share to generate a second partial result, wherein the first entity and the second entity respectively exchange the first partial result and the second partial result as part of a secure multi-party computation process;

determining a combined result based on the first partial result and the second partial result; and sending the combined result to an entity comprising one or more of a data provider that provides the data, an algorithm provider that provides the algorithm, and a third party that initiated a process between the data provider and the algorithm provider to display, for the entity, a representation of the combined result.

8. The method of claim 7, wherein the first Boolean logic gate subset and the second Boolean logic gate subset comprise AND gates and XOR gates.

9. The method of claim 7, wherein the algorithm provider provides the algorithm and wherein the algorithm provider comprises at least one first computing device.

10. The method of claim 9, wherein the data provider provides the data and comprises at least one second computing device.

11. The method of claim 7, wherein the algorithm is selected from a list of algorithms provided by algorithm provider.

12. The method of claim 7, wherein the algorithm is represented by one of a Boolean logic set, a neural network or an algebraic circuit.

13. The method of claim 7, further comprising encrypting the algorithm and encrypting the data.

14. A non-transitory computer-readable storage medium having stored therein instructions which, when executed by one or more processors, cause the one or more processors to:
convert a first algorithm subset of an algorithm into a first Boolean logic gate subset of a Boolean logic gate set and a second algorithm subset of the algorithm into a second Boolean logic gate subset of the Boolean logic gate set;

represent data as a first additive share and a second additive share, wherein the first additive share plus the second additive share equals the data such that sharing the first additive share or the second additive share does not reveal the data or any subset of the data;

process, by a first entity and using Beaver triplet, the first Boolean logic gate subset with the first additive share to generate a first partial result;

process, by a second entity and using Beaver triplet, the second Boolean logic gate subset with the second additive share to generate a second partial result, wherein the first entity and the second entity respectively exchange the first partial result and the second partial result as part of a secure multi-party computation process;

determine a combined result based on the first partial result and the second partial result; and sending the combined result to an entity comprising one or more of a data provider that provides the data, an algorithm provider that provides the algorithm, and a third party that initiated a process between the data provider and the algorithm provider to display, for the entity, a representation of the combined result.

15. The non-transitory computer-readable storage medium of claim 14, wherein the first Boolean logic gate subset and the second Boolean logic gate subset comprise AND gates and XOR gates.

16. The non-transitory computer-readable storage medium of claim 14, wherein the algorithm provider provides the algorithm and wherein the algorithm provider comprises at least one first computing device and the data provider provides the data and wherein the data provider comprises at least one second computing device.

* * * * *